(12) United States Patent
Zhu et al.

(10) Patent No.: US 12,124,627 B2
(45) Date of Patent: Oct. 22, 2024

(54) GLOVE-BASED HUMAN MACHINE INTERFACE

(71) Applicant: NATIONAL UNIVERSITY OF SINGAPORE, Singapore (SG)

(72) Inventors: Minglu Zhu, Singapore (SG); Chengkuo Lee, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 0 days.

(21) Appl. No.: 17/758,005

(22) PCT Filed: Jan. 5, 2021

(86) PCT No.: PCT/SG2021/050002
§ 371 (c)(1),
(2) Date: Jun. 24, 2022

(87) PCT Pub. No.: WO2021/141533
PCT Pub. Date: Jul. 15, 2021

(65) Prior Publication Data
US 2023/0020111 A1    Jan. 19, 2023

(30) Foreign Application Priority Data
Jan. 6, 2020    (SG) .............................. 10202000096S

(51) Int. Cl.
*G06F 3/01*    (2006.01)
*G06N 3/08*    (2023.01)
(52) U.S. Cl.
CPC .............. *G06F 3/014* (2013.01); *G06F 3/016* (2013.01); *G06N 3/08* (2013.01)

(58) Field of Classification Search
CPC ............ G06F 3/014; G06F 3/016; G06N 3/08
See application file for complete search history.

(56) References Cited

U.S. PATENT DOCUMENTS

2003/0016207 A1    1/2003    Tremblay et al.
2004/0164880 A1    8/2004    Nguyen
(Continued)

FOREIGN PATENT DOCUMENTS

CN    105739698 A    7/2016
CN    106662914 A    5/2017
(Continued)

OTHER PUBLICATIONS

Booth, D. Shah, J. C. Case, E. L. White, M. C. Yuen, O. Cyr-Choiniere, R. Kramer-Bottiglio, OmniSkins: Robotic skins that turn inanimate objects into multifunctional robots. Sci. Robot. 3, 1-10 (2018).
(Continued)

*Primary Examiner* — Michael Pervan
(74) *Attorney, Agent, or Firm* — INNOVATION CAPITAL LAW GROUP, LLP; Vic Lin

(57) ABSTRACT

A wearable human machine interface (HMI) comprises a plurality of triboelectric finger bending sensors configured to sense finger bending, deflecting or curling; a triboelectric palm sensor configured to detect an applied force and its direction; and at least one mechanical stimulator configured to provide haptic feedback. The human machine interface is configured to be worn on a human hand and may take the form of a glove.

20 Claims, 32 Drawing Sheets

(56) References Cited

U.S. PATENT DOCUMENTS

| | | |
|---|---|---|
| 2016/0054797 A1 | 2/2016 | Tokubo et al. |
| 2016/0054798 A1 | 2/2016 | Messingher et al. |
| 2018/0335842 A1 | 11/2018 | Rubin et al. |
| 2019/0354222 A1* | 11/2019 | Frescas ............... G06F 3/016 |

FOREIGN PATENT DOCUMENTS

| | | |
|---|---|---|
| CN | 107272908 A | 10/2017 |
| CN | 107896508 A | 4/2018 |
| CN | 108114423 A | 6/2018 |
| CN | 109889081 A | 6/2019 |
| CN | 111665937 A | 9/2020 |
| KR | 101626375 B1 | 6/2016 |
| KR | 101821048 B1 | 1/2018 |
| WO | 2016090483 A1 | 6/2016 |
| WO | 2018127839 A3 | 9/2018 |

OTHER PUBLICATIONS

Boutry, M. Jorda, O. Vardoulis, O. Khatib, Z. Bao, M. Negre, A. Chortos, A hierarchically patterned, bioinspired e-skin able to detect the direction of applied pressure for robotics. Sci. Robot. 3, eaau6914 (2018).

Caremel, G. Chernyshov, G. Liu, K. Kunze, Muscle-Wire glove: Pressure-Based haptic interface. Int. Conf. Intell. User Interfaces, Proc. IUI. 150, 15-16 (2018).

Cheng, E. Dean-Leon, F. Bergner, J. R. G. Olvera, Q. Leboutet, P. Mittendorfer, A Comprehensive Realization of Robot Skin: Sensors, Sensing, Control, and Applications. Proc. IEEE. 107, 1-18 (2019).

Cheng, K. Ramirez-Amaro, M. Beetz, Y. Kuniyoshi, Purposive learning: Robot reasoning about the meanings of human activities. Sci. Robot. 4, 1-4 (2019).

Chiu, et al., A smart glove with integrated triboelectric nanogenerator for self-powered gesture recognition and language expression; Science and Technology of Advanced Materials, 2019, vol. 20, No. 1, 964-971.

Chun, et al., Self-Powered Pressure- and Vibration-Sensitive Tactile Sensors for Learning Technique-Based Neural Finger Skin; Nano Lett. 2019, 19, 3305-3312.

Chun, Y. J. Son, E. S. Jeon, S. Lee, C. S. Han, A Self-Powered Sensor Mimicking Slow- and Fast-Adapting Cutaneous Mechanoreceptors. Adv. Mater. (2018), doi:10.1002/adma.201706299.

Deng, et al., Cowpea-structured PVDF/ZnO nanofibers based flexible self-powered piezoelectric bending motion sensor towards remote control of gestures; Nano Energy 55 (2019) 516-525.

Di Giacomo, L. Bonanomi, V. Costanza, B. Maresca, C. Daraio, Biomimetic Temperature-Sensing layer for artificial skins. Sci. Robot. 2, 1-7 (2017).

Emokpae, et al., Flex Force Smart Glove Prototype for Physical Therapy Rehabilitation, Lasarrus Clinic and Research Center, Baltimore MD, 2018, 4 pages.

Fujiwara, et al., Flexible optical fiber bending transducer for application in glove-based sensors. IEEE Sens. J. 14, 3631-3636 (2014).

Gao, et al., Wearable Microfluidic Diaphragm Pressure Sensor for Health and Tactile Touch Monitoring. Adv. Mater. 29, 1-8 (2017).

Hammond, et al., Toward a modular soft sensor-embedded glove for human hand motion and tactile pressure measurement. IEEE Int. Conf. Intell. Robot. Syst., 4000-4007 (2014).

Han, et al., Human-Machine Interface for wheelchair control with EMG and Its Evaluation. Annu. Int. Conf. IEEE Eng. Med. Biol.—Proc. 2, 1602-1605 (2003).

Han, F. Anderson, P. Irani, T. Grossman, Hydroring: Supporting mixed reality haptics using liquid flow. UIST 2018—Proc. 31st Annu. ACM Symp. User Interface Softw. Technol., 913-925 (2018).

He, Y. Wu, Z. Feng, C. Sun, W. Fan, Z. Zhou, K. Meng, E. Fan, J. Yang, Triboelectric vibration sensor for a human-machine interface built on ubiquitous surfaces. Nano Energy. 59, 689-696 (2019).

He, Z. Sun, Q. Shi, M. Zhu, D. V. Anaya, M. Xu, T. Chen, M. R. Yuce, A. V. Y. Thean, C. Lee, Self-powered glove-based intuitive interface for diversified control applications in real/cyber space. Nano Energy. 58, 641-651 (2019).

Hori, et al., Regional 3-axis plantar forces during stair ascent. Proc. IEEE Int. Conf. Micro Electro Mech. Syst. 2, 1033-1036 (2013).

Hu et al., Visual Gesture Recognition for Human-Machine Interface of Robot Teleoperation. IEEE Int. Conf. Intell. Robot. Syst. 2, 1560-1565 (2003).

Hua, J. Sun, H. Liu, R. Bao, R. Yu, J. Zhai, C. Pan, Z. L. Wang, Skin-inspired highly stretchable and conformable matrix networks for multifunctional sensing. Nat. Commun. 9, 1-11 (2018).

International Search Report & Written Opinion dated Mar. 30, 2021 from PCT Application No. PCT/SG2021/050002, 13 pages.

Kiguchi, K. Iwami, M. Yasuda, K. Watanabe, T. Fukuda, An exoskeletal robot for human shoulder joint motion assist. IEEE/ASME Trans. Mechatronics. 8, 125-135 (2003).

Lee, A. Reuveny, J. Reeder, S. Lee, H. Jin, Q. Liu, T. Yokota, T. Sekitani, T. Isoyama, Y. Abe, Z. Suo, T. Someya, A transparent bending-insensitive pressure sensor. Nat. Nanotechnol. 11, 472-478 (2016).

Lee, Y. J. Tan, H. Yao, S. Li, H. H. See, M. Hon, K. A. Ng, B. Xiong, J. S. Ho, B. C. K. Tee, A neuro-inspired artificial peripheral nervous system for scalable electronic skins. Sci. Robot. 4, eaax2198 (2019).

Lipomi, M. Vosgueritchian, B. C. K. Tee, S. L. Hellstrom, J. A. Lee, C. H. Fox, Z. Bao, Skin-like pressure and strain sensors based on transparent elastic films of carbon nanotubes. Nat. Nanotechnol. 6, 788-792 (2011).

Liu et al., Epidermal mechano-acoustic sensing electronics for cardiovascular diagnostics and human-machine interfaces. Sci. Adv. 2 (2016), doi:10.1126/sciadv.1601185.

Millán, et al., Noninvasive brain-actuated control of a mobile robot by human EEG. IEEE Trans. Biomed. Eng. 51, 1026-1033 (2004).

O' Flynn, et al., Integrated Smart Glove for Hand Motion Monitoring. Sensorcomm 2015 Ninth Int. Conf. Sens. Technol. Appl., 45-50 (2015).

Pu, H. Guo, Q. Tang, J. Chen, L. Feng, G. Liu, X. Wang, Y. Xi, C. Hu, Z. L. Wang, Rotation sensing and gesture control of a robot joint via triboelectric quantization sensor. Nano Energy. 54, 453-460 (2018).

Shi, C. Lee, Self-Powered Bio-Inspired Spider-Net-Coding Interface Using Single-Electrode Triboelectric Nanogenerator. Adv. Sci. 1900617, 1900617 (2019).

Sundaram, P. Kellnhofer, Y. Li, J. Zhu, A. Torralba, W. Matusik, Learning the signatures of the human grasp using a scalable tactile glove. Nature. 569, 698-702 (2019).

Tee, A. Chortos, R. R. Dunn, G. Schwartz, E. Eason, Z. Bao, Tunable flexible pressure sensors using microstructured elastomer geometries for intuitive electronics. Adv. Funct. Mater. 24, 5427-5434 (2014).

Thuruthel, B. Shih, C. Laschi, M. T. Tolley, Soft robot perception using embedded soft sensors and recurrent neural networks. Sci. Robot. 4, eaav1488 (2019).

Trinitatova et al., DeltaTouch: a 3D Haptic Display for Delivering Multimodal Tactile Stimuli at the Palm, 2019 IEEE World Haptics Conference (WHC), Japan, 6 pages.

Wang, Y. Zhang, X. Zhang, Z. Huo, X. Li, M. Que, Z. Peng, H. Wang, C. Pan, A Highly Stretchable Transparent Self-Powered Triboelectric Tactile Sensor with Metallized Nanofibers for Wearable Electronics. Adv. Mater. 30, 1-8 (2018).

Wu, J. K. Yim, J. Liang, Z. Shao, M. Qi, J. Zhong, Z. Luo, X. Yan, M. Zhang, X. Wang, R. S. Fearing, R. J. Full, L. Lin, Insect-scale fast moving and ultrarobust soft robot. Sci. Robot. 4, eaax1594 (2019).

Wu, W. Ding, R. Liu, J. Wang, A. C. Wang, J. Wang, S. Li, Y. Zi, Z. L. Wang, Keystroke dynamics enabled authentication and identification using triboelectric nanogenerator array. Mater. Today. 21, 216-222 (2018).

Xu, L. B. Huang, M. C. Wong, L. Chen, G. Bai, J. Hao, Environmentally Friendly Hydrogel-Based Triboelectric Nanogenerators for Versatile Energy Harvesting and Self-Powered Sensors. Adv. Energy Mater. 7, 1-8 (2017).

Yang, Y. Pang, L. Zhang, C. Lu, J. Chen, T. Zhou, C. Zhang, Z. L. Wang, Tribotronic Transistor Array as an Active Tactile Sensing System. ACS Nano. 10, 10912-10920 (2016).

(56) References Cited

OTHER PUBLICATIONS

Yeom, K. Chen, D. Kiriya, Z. Yu, G. Cho, A. Javey, Large-area compliant tactile sensors using printed carbon nanotube active-matrix backplanes. Adv. Mater. 27, 1561-1566 (2015).

Yogeswaran, W. Dang, W. T. Navaraj, D. Shakthivel, S. Khan, E. O. Polat, S. Gupta, H. Heidari, M. Kaboli, L. Lorenzelli, G. Cheng, R. Dahiya, New materials and advances in making electronic skin for interactive robots. Adv. Robot. 29, 1359-1373 (2015).

Zhang et al., Cooperative Sensing and Wearable Computing for Sequential Hand Gesture Recognition; IEEE Sensors Journal, vol. 19, No. 14, Jul. 15, 2019.

Zhang, P. Wang, K. Sun, C. Wang, D. Diao, Intelligently detecting and identifying liquids leakage combining triboelectric nanogenerator based self-powered sensor with machine learning. Nano Energy. 56, 277-285 (2019).

Zhao, J. Yang, J. Chen, G. Zhu, Z. Jiang, X. Liu, G. Niu, Z. L. Wang, B. Zhang, Keystroke Dynamics Identification Based on Triboelectric Nanogenerator for Intelligent Keyboard Using Deep Learning Method. Adv. Mater. Technol. 4, 1-9 (2019).

Zhu M. et al., Haptic-feedback smart glove as a creative human-machine interface (HMI) for virtual/augmented reality applications. Science Advances, May 8, 2020, vol. 6, No. 19, pp. 1-14.

Zhu M. et al., Sensory-Glove-Based Human Machine Interface for Augmented Reality (AR) Applications. 2020 IEEE 33rd International Conference on Micro Electro Mechanical Systems (MEMS), Jan. 22, 2020, pp. 16-19.

Zhu, Q. Shi, T. He, Z. Yi, Y. Ma, B. Yang, T. Chen, C. Lee, Self-Powered and Self-Functional Cotton Sock Using Piezoelectric and Triboelectric Hybrid Mechanism for Healthcare and Sports Monitoring. ACS Nano. 13, 1940-1952 (2019).

China Office Action dated Dec. 23, 2023 from Application No. 202180008290.2 (20 pp).

Wen, Feng et al., "Machine Learning Glove Using Self-Powered Conductive Superhydrophobic Triboelectric Textile for Gesture Recognition in VR/AR Applications", Adv. Sci. 2020, 7, 2000261 (15 pp).

Yingjie, Tang et al., "Self-driven Finger Motion Sensor Based on Triboelectric Nanogenerator", 2018, College of Physics and Engineering, Zhengzhou University, Zhengzhou 450001, China (3 pp).

He, Tianyiyi et al., "Self-powered glove-based intuitive interface for diversified control applications in real/cyber space", Nano Energy 58 (2019) 641-651 (11pp).

* cited by examiner

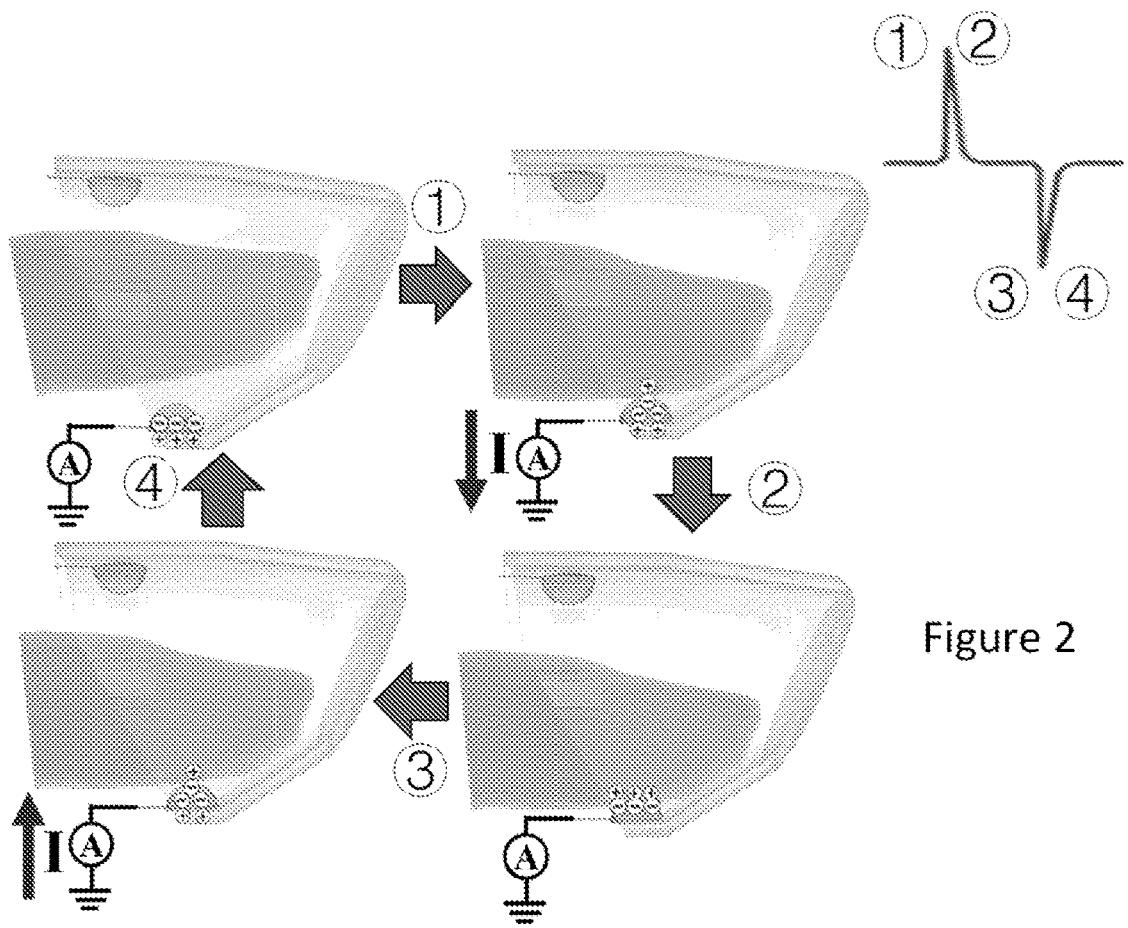
Figure 2
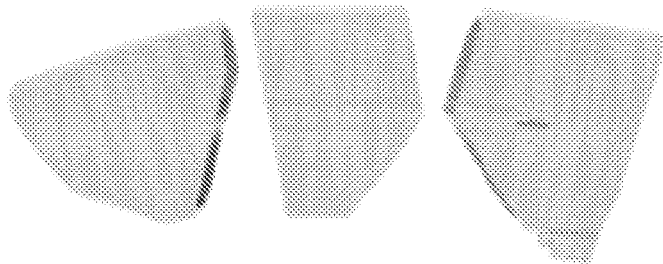
Figure 3
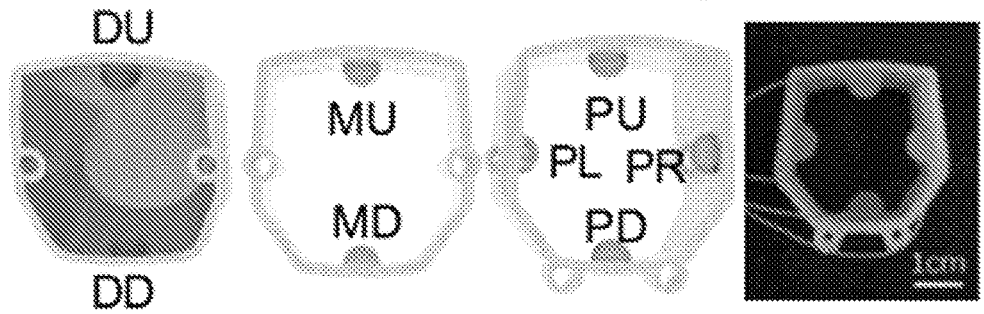

Figure 4a
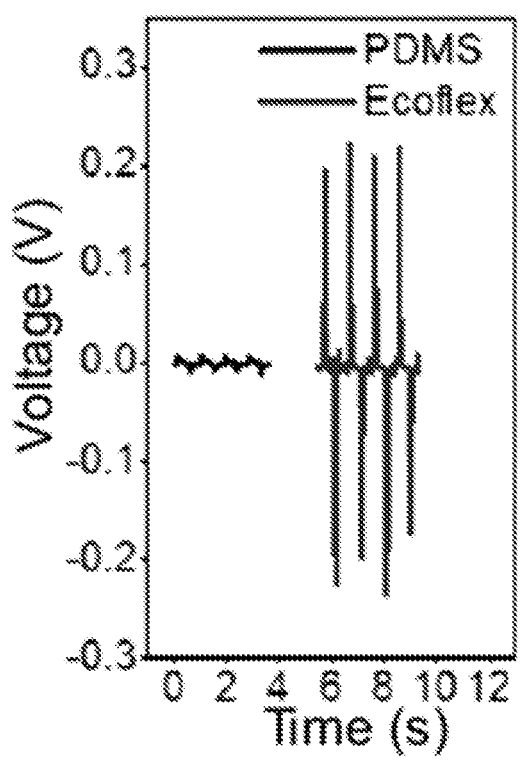
Figure 4b
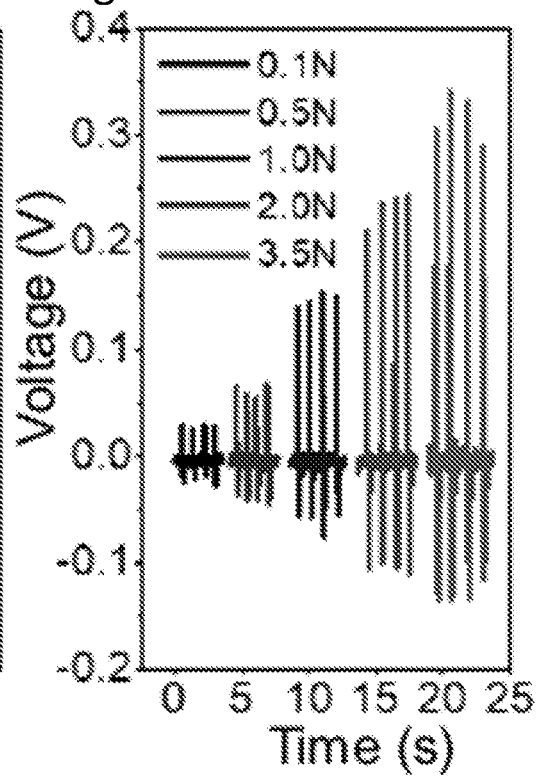
Figure 5
(i) Finger size: 60mm  (ii) Finger size: 50mm
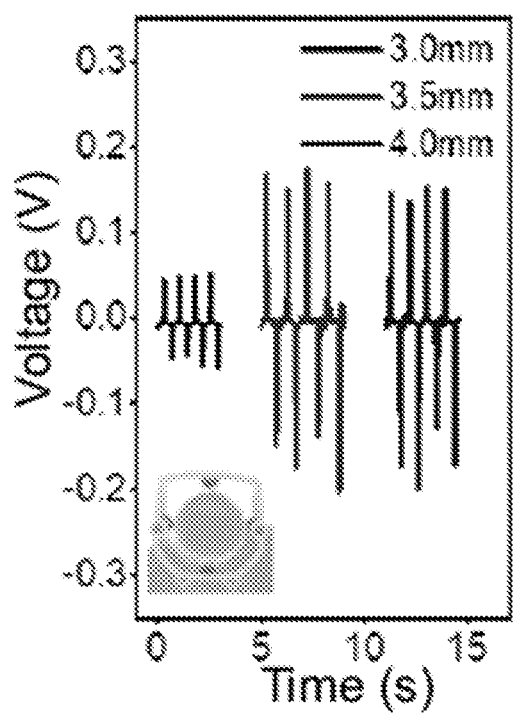
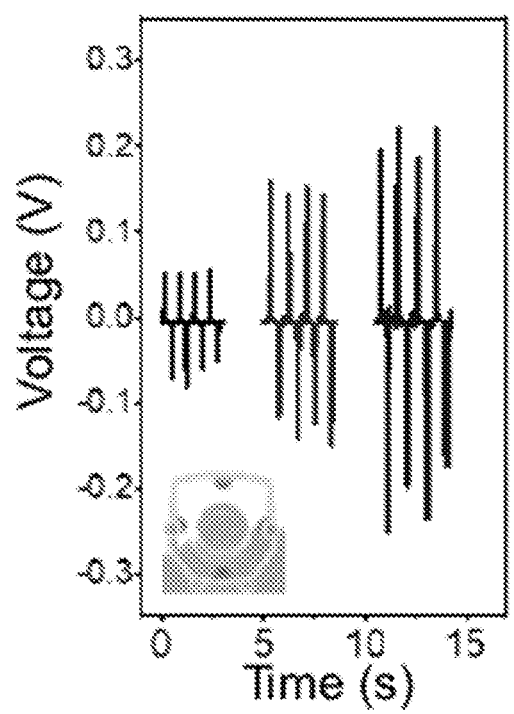

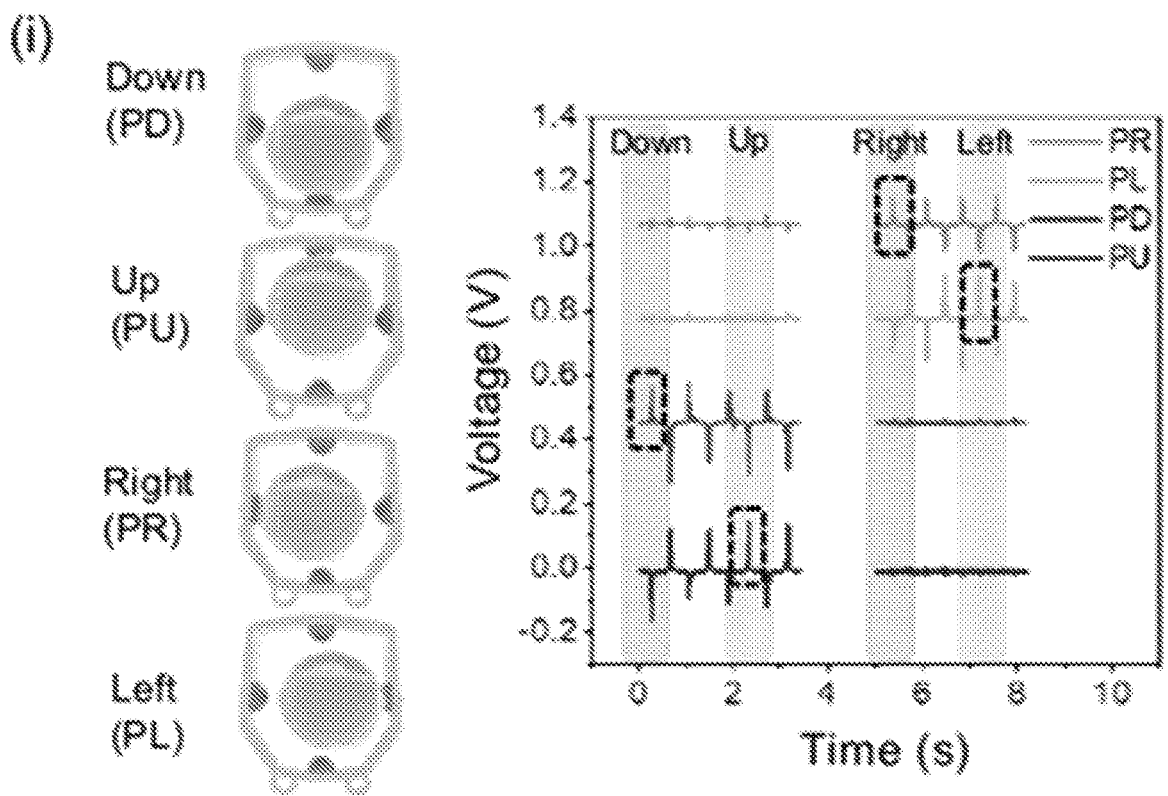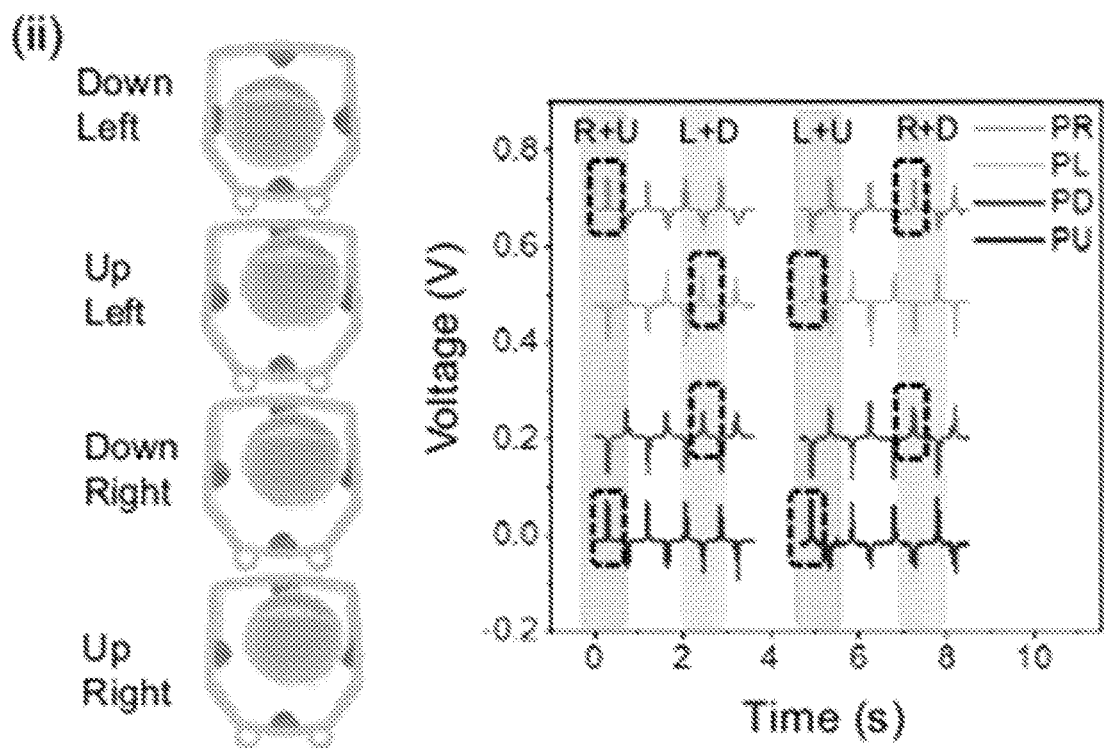
Figure 7 four contact hemispheres    four contact electrodes

The parameters for constructing Convolution Neural Network (CNN)

| No | Layer Type | No. of Filters | Kernel/ Pool Size | Stride | Input Size | Output Size | Padding |
|---|---|---|---|---|---|---|---|
| 1 | Convolution 1 | 32 | 5 | 1 | (None,200,16) | (None,200,32) | Same |
| 2 | Max-pooling 1 |  | 2 | 2 | (None,200,32) | (None,100,32) | Same |
| 3 | Convolution 2 | 64 | 5 | 1 | (None,100,32) | (None,100,64) | Same |
| 4 | Max-pooling 2 |  | 2 | 2 | (None,100,64) | (None,50,64) | Same |
| 5 | Convolution 3 | 128 | 5 | 1 | (None,50,64) | (None,50,128) | Same |
| 6 | Max-pooling 3 |  | 2 | 2 | (None,50,128) | (None,25,128) | Same |
| 7 | Flatten |  |  |  | (None,25,128) | (None,3200) |  |
| 8 | Dense (3200) |  |  |  | (None,3200) | (None,3200) |  |
| 9 | Dense (7) |  |  |  | (None,3200) | (None,7) |  |

Figure 33

| Classification accuracy | | Penalty parameter C | | | |
|---|---|---|---|---|---|
| | | $1 \times 10^{-2}$ | $1 \times 10^{-1}$ | 1 | 10 |
| Linear kernel | 100 | 88.02% | 94.14% | 93.56% | 91.19% |
| | 200 | 90.84% | 94.84% | 95.25% | 94.97% |
| | 300 | 91.13% | 95.33% | 95.89% | 96.00% |
| | 400 | 91.34% | 95.72% | 96.26% | 96.31% |
| | 500 | 91.34% | 95.89% | 96.41% | 96.30% |
| Radial basis kernel | 100 | 63.98% | 79.56% | 92.66% | 96.30% |
| | 200 | 58.59% | 78.55% | 91.43% | 96.86% |
| | 300 | 53.75% | 69.77% | 89.23% | 96.36% |
| | 400 | 51.25% | 67.34% | 87.03% | 96.00% |
| | 500 | 50.31% | 64.84% | 86.22% | 96.05% |

Figure 34

GLOVE-BASED HUMAN MACHINE INTERFACE

TECHNICAL FIELD

The present invention relates to human machine interfaces (HMIs), configured to be worn on a human hand. Additionally, but not exclusively, the HMIs may be provided in the form of a glove.

BACKGROUND

Currently, Human Machine Interfaces (HMIs) between a user and a piece of equipment, or a virtual world, are key elements in achieving effective, intuitive, and seamless manipulation for the completion of tasks. As technology advances, HMIs are evolving from conventional controls, such as keyboards, mice and joysticks, towards alternatives such as voice control (e.g. for mobile phones and smart home devices) and vision recognition (e.g. for facial recognition and human motion capture). However, some of these technologies have limitations in the applications of Virtual Reality (VR) and Augmented Reality (AR). In this respect, HMIs in the form of wearable gloves have advantages in that they provide high precision and control in multiple degrees of freedom (DOFS), and can also be used to complement vision and voice recognition.

Several parameters may be used to capture information from hand gestures. For example, finger bending actions may be detected and measured, as well as lateral direction motions. Inertial sensors such as accelerometers and gyroscopes are commonly employed as they provide highly sensitive motion detection, and the available DOF may be increased by increasing the number of sensors. However, additional sensors are needed for the detection of applied force and this can lead to complex and costly circuitry and the requirement for additional processing capability to process different types of signal. Resistive sensors are also often used, enabling measurement of strain, normal force and shear force. However, resistive sensors may suffer from problems such as temperature effect, zero shift and creep. Optical sensors have been utilised to measure finger bending via detection of incident light from a diode, but these too have their limitations. All of these mentioned sensors will consume the extra power for generating specific signals. Especially for the massive distributed sensor network, power saving becomes a major concern for the long-term sustainability of the wearable HMIs.

HMIs based on wearable gloves may also include feedback mechanisms to provide an immersive experience and to improve sensing capabilities. These mechanisms are typically based upon technologies such as vibration motors, microfluidic channels, pneumatic chambers and wire actuators. However, the bulky size of feedback systems utilising these technologies, and the huge power requirements, are often limiting where portability and extended use times are an issue.

The provision of an HMI in the form of a wearable glove which alleviates some or all of the above issues and problems is therefore desirable.

SUMMARY OF INVENTION

In one aspect there is provided a wearable human machine interface (HMI), comprising: a plurality of triboelectric finger bending sensors configured to sense finger bending, deflecting or curling; a triboelectric palm sensor configured to detect an applied force and its direction; and at least one mechanical stimulator configured to provide haptic feedback. The human machine interface is configured to be worn on a human hand.

In a specific example, the interface may further comprise a wearable case for supporting said sensors and stimulator. Preferably, the wearable case may comprise a plurality of case segments, including a palm segment and multiple finger segments.

Preferably, the plurality of triboelectric finger bending sensors may comprise at least one triboelectric sensor respectively associable, in use, with each phalanx of a finger and at least one triboelectric sensor respectively associable, in use, with each phalanx of a thumb, each said sensor configured to detect one or more of bending, curling, deflecting of the associated phalanx.

Specifically, each sensor of the plurality of triboelectric finger bending sensors may comprise a contact portion, comprising a raised contact surface and a flat bottom, and an electrode portion embedded in or otherwise attached to the flat bottom, wherein the raised contact surface is preferably hemispherical.

Preferably, a contact portion of each sensor of the plurality of triboelectric finger bending sensors may comprise elastomeric material, and wherein the interface is configured such that, in use, said elastomeric material is directly contactable by a wearer's finger or thumb, said contact generating a triboelectric output. It is envisaged that the plurality of triboelectric finger bending sensors may comprise sixteen triboelectric finger bending sensors.

The triboelectric palm sensor may comprise an upper contact portion, a lower contact portion within said upper contact portion, and an electrode portion configured to be directly contactable by the lower contact portion, said contact generating a triboelectric output. It is possible that the upper contact portion may comprise a dome, the lower contact portion comprises four hemispheres located within said dome, and the electrode portion comprises four contact pads, each hemisphere configured to act as a respective contact point for a corresponding contact pad of the electrode portion upon application of an external force to the dome.

It is also envisaged that the upper contact portion and the lower contact portion of the palm sensor may comprise elastomeric material.

In a specific example, the at least one mechanical stimulator comprises a piezoelectric (PZT) chip. In another example, the interface may comprise five PZT chips, each respectively associable, in use, with a finger or thumb of the user.

The interface may comprise a wiring assembly configured to bias the interface towards an initial position. In the event that the wearable case comprises a plurality of case segments, including a palm segment and multiple finger segments, then the wiring assembly may be configured to interconnect the plurality of case segments.

It is envisaged that the sensors may be configured to be at least partially fabricated using a 3D printing technique.

In another aspect there is provided a human machine interface system, comprising the wearable human machine interface (HMI) of the first aspect above; a microprocessor configured to receive triboelectric outputs from the plurality of triboelectric finger bending sensors and/or the triboelectric palm sensor and to determine, based on said outputs, a degree of bending of one or more phalanxes of a wearer's hand. The microprocessor is further configured to output a signal to actuate vibration of the at least one mechanical stimulator.

In a specific embodiment, the microprocessor may be configured to output the signal to the at least one mechanical stimulator based upon a triboelectric output received from the palm sensor. The microprocessor may be configured to modify an amplitude of the signal to the at least one mechanical stimulator based upon a triboelectric output received from the palm sensor.

Preferably, the microprocessor may be configured to determine, based upon a triboelectric output received from the palm sensor, a direction of the applied force. In a specific example, the microprocessor may be configured to output, to a neural network, triboelectric outputs from the plurality of triboelectric finger bending sensors and/or the triboelectric palm sensor.

In a further aspect, there is provided a method of object recognition comprising: receiving, by a neural network, outputs of the plurality of triboelectric finger bending sensors and/or the triboelectric palm sensor of the HMI interface of the first aspect above, the outputs being generated during grabbing of an object by a wearer of the HMI interface.

It should be appreciated that features relating to one aspect may also be applicable for the other aspects.

BRIEF DESCRIPTION OF DRAWINGS

FIG. 2 illustrates waveform output from an exemplary triboelectric sensor and corresponding finger bending and return;

FIG. 3 illustrates exemplary finger cases (segments) of each phalanx, the positions of triboelectric sensors within the finger cases and the proximal phalanx;

FIG. 4a illustrates a comparison of triboelectric outputs of exemplary sensors made of different materials (left); and FIG. 4b illustrates a relationship between a changing loading force and the triboelectric output of an exemplary sensor under 2 Hz frequency (right);

FIG. 5 illustrates variations of triboelectric outputs with different sensor sizes for a finger size of (i) 60 mm and (ii) 50 mm;

FIG. 7 illustrates triboelectric outputs from four exemplary sensors (PU, PD, PR, PL) under the bending of finger in eight directions, (i) up, down, left and right, and (ii) up+left, up+right, down+left and down+right;

FIG. 23 illustrates confusion maps of object recognition derived from two models made by (i) CNN and (ii) SVM, with 100 tests for each object and 40 tests for baseline, output class referring to recognized results, and target class referring to true objects.

FIGS. 30 and 31 respectively illustrate core functions of an Arduino PCB and Unity software for realizing (FIG. 30) exemplary triboelectric sensor based virtual hand manipulation, and (FIG. 31) haptic feedback from virtual events, such as collision or touching;

FIG. 33 illustrates a table of parameters for constructing a Convolution Neural Network (CNN); and FIG. 34 illustrates SVM classification accuracy with different parameters and dimensions (NB: the data of accuracy are average values from 10 runs for each parameter).

DETAILED DESCRIPTION

Described herein with reference to FIGS. 1 to 34 is a simple, cost-effective and intuitive HMI in the form of a wearable "smart" glove. The glove-based HMI, hereafter referred to as a glove, may provide multi-dimensional motion detections and real-time haptic feedback.

In one example, machine learning techniques may be used to expand the glove's functionality with a minimal number of sensors, enabling performance of complex tasks, such as object recognition. Alternatively or additionally, for AR applications the glove may act as a complementary control interface to conventional vision and voice control terminals, providing augmented interactions. The glove may also have applications in fields such as industrial productivity, educational training, entertainment, and home care.

Figure 1:
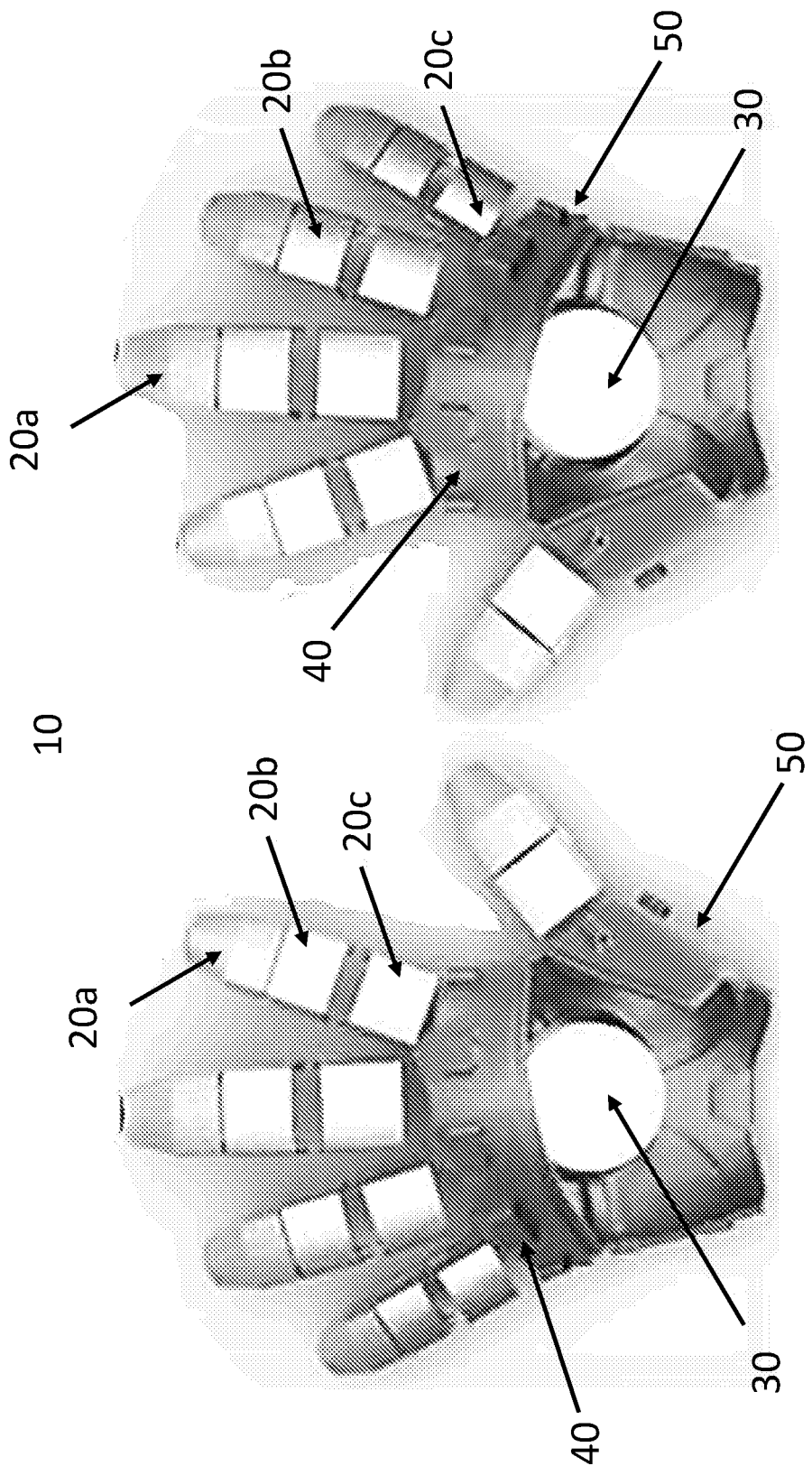
FIG. 1 illustrates an exemplary pair of glove-based HMIs.

As illustrated in FIG. 1, the glove 10 comprises triboelectric sensors, which may be elastomer-based, and one or more piezoelectric (PZT) stimulators, which may comprise lead zirconate titanate. In one example, these components form three major functional units of the glove: triboelectric finger bending sensors 20a,b,c; a triboelectric palm sensor 30; and at least one piezoelectric mechanical stimulator 40. These three units will be discussed in more detail below. The sensors are supported by (e.g. attached to) a glove case 50, generally comprising four finger cases, a thumb case, a front and a rear (palm) case. In one example, each finger case and thumb case is formed from a number of connected case segments, typically three segments for each finger (one for phalanx) and two segments for a thumb. The glove case may be formed integrally, or may comprise a number of case sections which may be combined to form a glove case. In one example, the glove case may be suitable for being 3D printed. A microcontroller for receiving, transmitting and processing signals from/to the sensors of the glove may be in data communication (e.g. wires, wireless) with the glove. The microcontroller may be integral to the glove or may be provided separately, or a combination thereof. A wiring assembly, preferably comprising metal alloy, connects the glove cases(s)/segments and provides a restoring force.

In the discussion that follows, it will be appreciated that the glove may be configured to so as to be wearable on a right-hand or a left-hand, and may be provided as a pair, as illustrated in FIG. 1. In this description, references to a glove may equally apply to a pair of gloves (i.e. one right-handed glove and one left-handed glove).

Features of the embodiments and examples described herein may be combined or substituted without limitation.

Triboelectric Finger Bending Sensors

As illustrated in FIG. 2, the triboelectric finger bending sensors of the glove-based HMI can detect motions of each phalanx with multiple DOFs. In this illustrated example, each finger bending sensor comprises a contact portion, comprising a raised contact surface and a flat bottom, and an electrode portion embedded in or otherwise attached to the flat bottom.

For example, each contact surface may be hemispherically shaped. Although other shapes, such as pyramidal, cubic, trapezoidal and so on may be envisaged, in the examples described herein a hemispherical or dome shape is used. Each contact portion may be fabricated from a soft elastomer, for example Eco-flex™ (00-20), comprising platinum-catalyzed silicones (www.smooth-on.com/products/ecoflex-00-20/). The electrode portion may take the form of a thin pad, preferably made of aluminium.

The finger sensors may be bonded or otherwise attached to an inner surface of at least one finger case of the glove case. The distribution of finger sensors is determined by the available DOFs of three parts of the human finger, illustrated in FIG. 3: distal phalanx (DP) closest to the finger nail, middle phalanx (MP) and proximal phalanx (PP) closest to the hand. As shown, both DP and MP can only move up and down (DU, DD, MU, MD), whereas PP can deflect in other directions e.g. up, down, left and right (PU, PL, PR, PD). In one example, the fingers sensor arrangement (i.e. the finger sensor assembly) may include 2 DP, 2 MP, and 4 PP finger sensors in at least one finger case. Of course, depending upon the intended application it may be desirable to: have a greater or lesser number of sensors in each finger case; to have the same number of sensors in each finger case; to have a different number of sensors in two or more finger cases; to have at least one finger case with no sensors. In other words, the distribution of sensors is highly customisable, depending on the sensing requirement and degrees of freedom.

In general, the glove has four finger cases, as follows: index finger, middle finger, ring finger and pinky finger. The glove may also have a thumb case. Each case may be formed by a number of segments as previously discussed. For some applications, alternative arrangements of finger and thumb cases may be provided. In this description, references to a finger bending sensor may also apply to triboelectric sensors configured to measure/detect bending of a thumb. In general, the finger bending sensors described herein may detect bending, curling, deflecting or other movements of fingers or thumbs.

Triboelectric output is generated from contact electrification during surface interaction between two materials with dissimilar electronegativity. For example, it is possible to utilise two external materials to carry out contact and separation of an arch-shaped structure, or the sliding of grating patterned strips. In contrast, for the finger bending sensors of the glove-based HMI described herein, the glove wearer's skin is utilized as a positive triboelectric material which interacts with triboelectric finger bending sensors forming a negative material. The triboelectric finger bending sensors described herein are capable of outputting self-generating signals, thereby considerably reducing power consumption of the glove-based HMI.

Referring back to FIG. 1, a triboelectric sensor typically outputs one of two opposite pulse waveforms, corresponding to either the contact or separation cycle, depending on which side the output signal is extracted. In the glove described herein, the triboelectric finger sensors rely on interaction between the sensor contact surface (e.g. the elastomer) and the skin of the finger. In a non-contact state (detail 1 of FIG. 1), the finger sensor is in a neutral condition wherein the contact surface negative charge is balanced by a positive charge from the embedded electrode pad. As the skin of a finger contacts the sensor contact surface e.g. the curved portion of the hemisphere (detail 2 of FIG. 1) the positive charge from the skin surface neutralizes the negative potential at the sensor contact surface, and causes the previous positive charge on the electrode pad to be repulsed to ground. This is because skin is generally much more electrically positive compared to the sensor contact surface (e.g. the elastomer). As a result, when the output signal is measured from the electrode pad, a positive pulse waveform is observed due to the current flow direction. In contrast, re-separation between finger skin and sensor contact surface (details 3 and 4 of FIG. 1) will lead to a return of the flow of positive charge on the electrode pad to neutralize the negative sensor contact surface, thereby generating a negative pulse waveform.

In other words, as the user of the glove bends their fingers and/or thumb, the variously-located triboelectric finger bending sensors supported by the glove case come into and out of contact with the skin of the user's fingers/thumb. As a result, the pulse waveform output by the sensors changes from positive to negative (or vice versa). This change in output can be used to determine which finger/thumb is being bent and in which direction.

The glove cases may be made from different types of elastomer. As shown in the comparison test of materials in FIG. 4a, for the same 4 mm diameter of hemisphere, the MP finger bending triboelectric sensor output in millivolts (mV) for the Eco-flex elastomer (approximately 200 mV) is much larger than that of the sensor made from polydimethylsiloxane (PDMS) elastomer. Both are biocompatible materials that ensure signal sensitivity and comfortable long-term use. The results of the test shown in FIG. 4a suggests that forming the finger bending sensor contact portion from the Eco-flex elastomer provides more accurate sensing of finger bending. According to the triboelectric theorem, generated output is mainly determined by the contact area for the same materials due to the amount of interacted surface charge.

The finger sensor output response against an applied force was characterized under 2 Hz frequency (FIG. 4b). For a 3.5 mm diameter hemispheric finger bending sensor, a typical sensing range from 0.1N to 3.5N (left to right) was obtained under 1.5 Hz pressing. This range may also be considered as a reference for choosing the stiffness of the connection wires (wiring assembly) that exert a restoring force during finger bending i.e. that biases the casing(s) towards an initial (unbended) position. As shown in FIG. 5, the effect of the hemispheric sensor contact surface diameter was studied with three samples of different hemispheric diameter: 3 mm (left), 3.5 mm (middle) and 4 mm (right), for a finger size of (i) 60 mm and a finger size of (ii) 50 mm perimeter. The output shows an increase as the sensor diameter size becomes larger (FIG. 5).

It will be appreciated that users may have a range of finger sizes. For a specific size of finger case and user, there is an optimized configuration for the highest output as depicted between FIG. 5(i) and FIG. 5(ii). In other words, the diameter of the finger bending sensors can be adjusted in line with the finger size. The limited inner space of the glove cases will set constraints for the contact and separation process, i.e., a bigger finger will experience less contact and separation motion, leading to less surface charge interaction. Where the glove described herein is comprised of separate finger cases, each joint of the glove can be replaced and customized to achieve the desired performance. In general, for the experiments described herein, a finger bending sensor hemispheric diameter of 3.5 mm was used.

Figure 6:
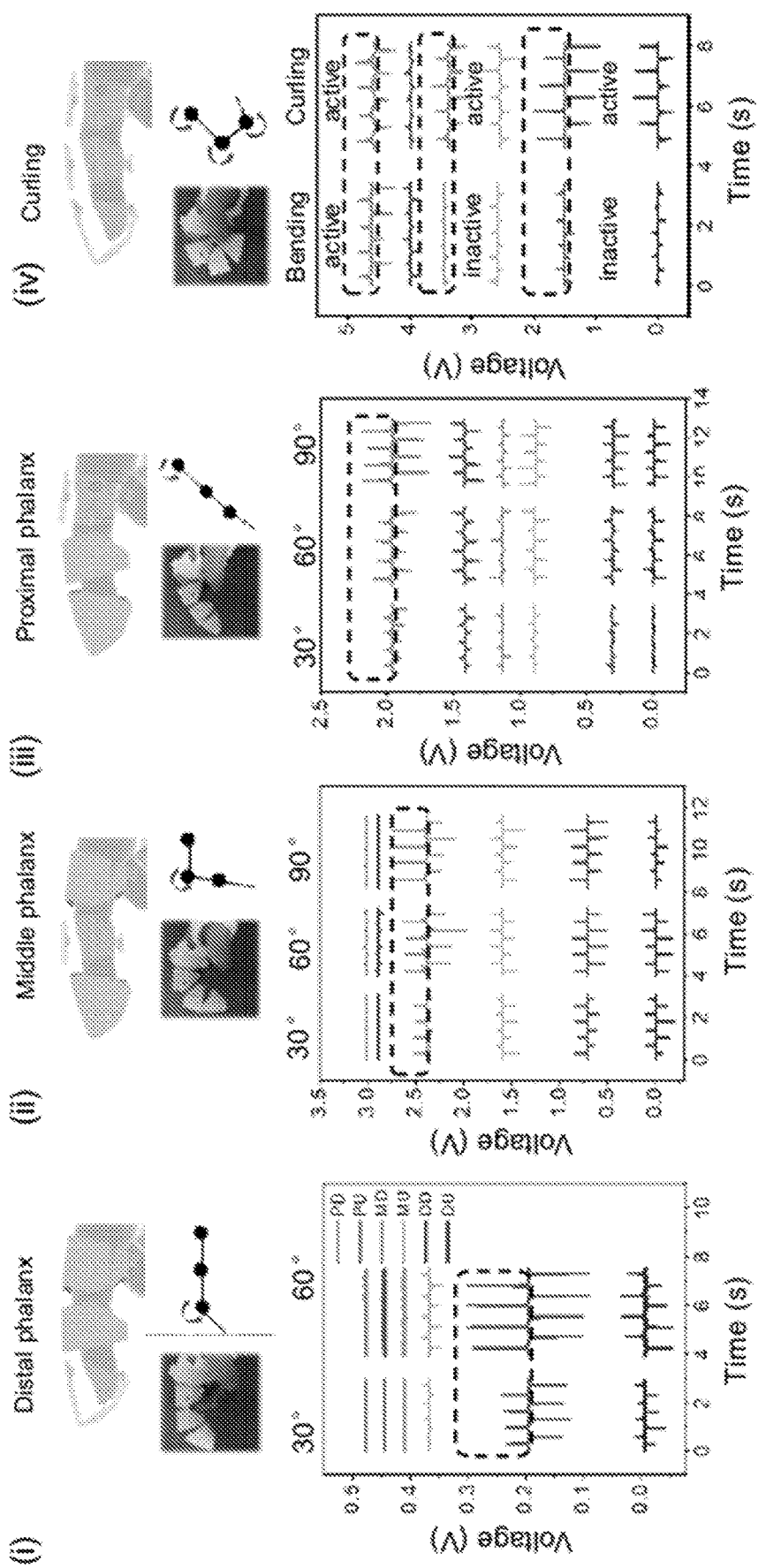
FIG. 6 illustrates triboelectric outputs from eight exemplary sensors (DU, DD, MU, MD, PU, PD, PR, PL) under the bending of (i) a distal phalanx, (ii) middle phalanx, (iii) proximal phalanx, and (iv) all three phalanges (curling), the dashed boxes indicating functional signals.

As shown in FIG. 6, an index finger was tested with a series of common motions to investigate the sensing capabilities of the triboelectric finger bending sensors. Based on the three segments of the index finger, finger bending sensors corresponding to up and down bending for the distal phalanx (DP), middle phalanx (MP), and proximal phalanx (PP) were provided. These finger sensors are respectively labelled DU (i.e. distal phalanx up), DD (i.e. distal phalanx down), MU (i.e. middle phalanx up), MD (i.e. middle phalanx down), PU (proximal phalanx up), and PD (proximal phalanx down). In addition, left and right bending finger sensors of PL and PR were also attached for the proximal phalanx. For the tests of an individual phalanx (FIG. 6(i), (ii) and (iii)), the signals of major functional sensors are highlighted in dashed boxes. These functional signals refer to the pulse-like output voltage peaks (positive/upward or negative/downward) marked by dashed boxes. These signals are used to identify whether a specific sensor is triggered, and what is the status of the triggering. For instance, a positive peak may indicate contact/press, and a negative peak may indicate separation/release.

In each of FIGS. 6(i), (ii), (iii) and (iv) sensor outputs are illustrated from top to bottom as follows: PD, PU, MD, MU, DD, DU.

To ensure that a distinction between different bending angles (30°, 60° and 90°) can be determined using the triboelectric finger bending sensors, the primary resolution (i.e. the difference between bending angles) of each phalanx was set to be 30°, according to obtained data with a reasonable tolerance of data error. The distal phalanx has only two angles (30° and 60°) to the actual motion range of human finger. As shown by the data in FIG. 6 for the middle phalanx and the proximal phalanx, both of which have three bending angles (30°, 60° and 90°), during bending, minor signals were detected from the DD (distal phalanx down) and MD (middle phalanx down) sensors, with larger signals detected for the major functional sensor (the PD, proximal phalanx down, sensor), especially for the larger bending angle (90°).

This phenomenon was caused by the controlling capability of the actual motion of an individual phalanx for the specific user, and it is frequently observed that the phalanx at the front (PD) will also be bent unintentionally during the bending of the middle or proximal phalanx. This unintentional bending was detected by the finger bending sensors, generating the minor signal output.

As shown in FIG. 6(iv), as an advantage of using multiple finger bending sensors, a curling motion of the finger can be differentiated from the bending motion of the proximal phalanx. From the data of three dashed boxes in FIG. 6(iv), it is obvious that both the DD and MD outputs for finger curling show signals above active threshold, and there are only insignificant outputs observed for DD and MD in bending motion.

In general, the joint of the proximal phalanx has more DOF compared to the other phalanxes. Illustrated in FIG. 7 are eight directions, including (i) the four standard directions of up, down, left and right, and (ii) four diagonal directions of up-right, down-left, up-left and down-right. In this example, the output from all four finger bending triboelectric sensors are measured simultaneously, so that signals from the theoretically inactivate (i.e. non-contacted) sensors can be monitored for potential interference, as the finger was barely contacting with all the sensors at the original state.

The measured data in FIG. 7 indicates that there is almost no interference between the two pairs of counter sensors, PR/PL and PU/PD. In other words, even though the finger may slide across the surface of PU/PD sensor when it performs left and right motion, the contacted surface area of the PU/PD sensor in fact leads to very low triboelectric charge transfer. For the four diagonal directions (FIG. 7(ii)), each direction can be detected using two adjacent sensors. As the contact force is distributed over two sensors, a decrease in sensor output from ~150 mV to less than 100 mV is also visible.

Figure 8:
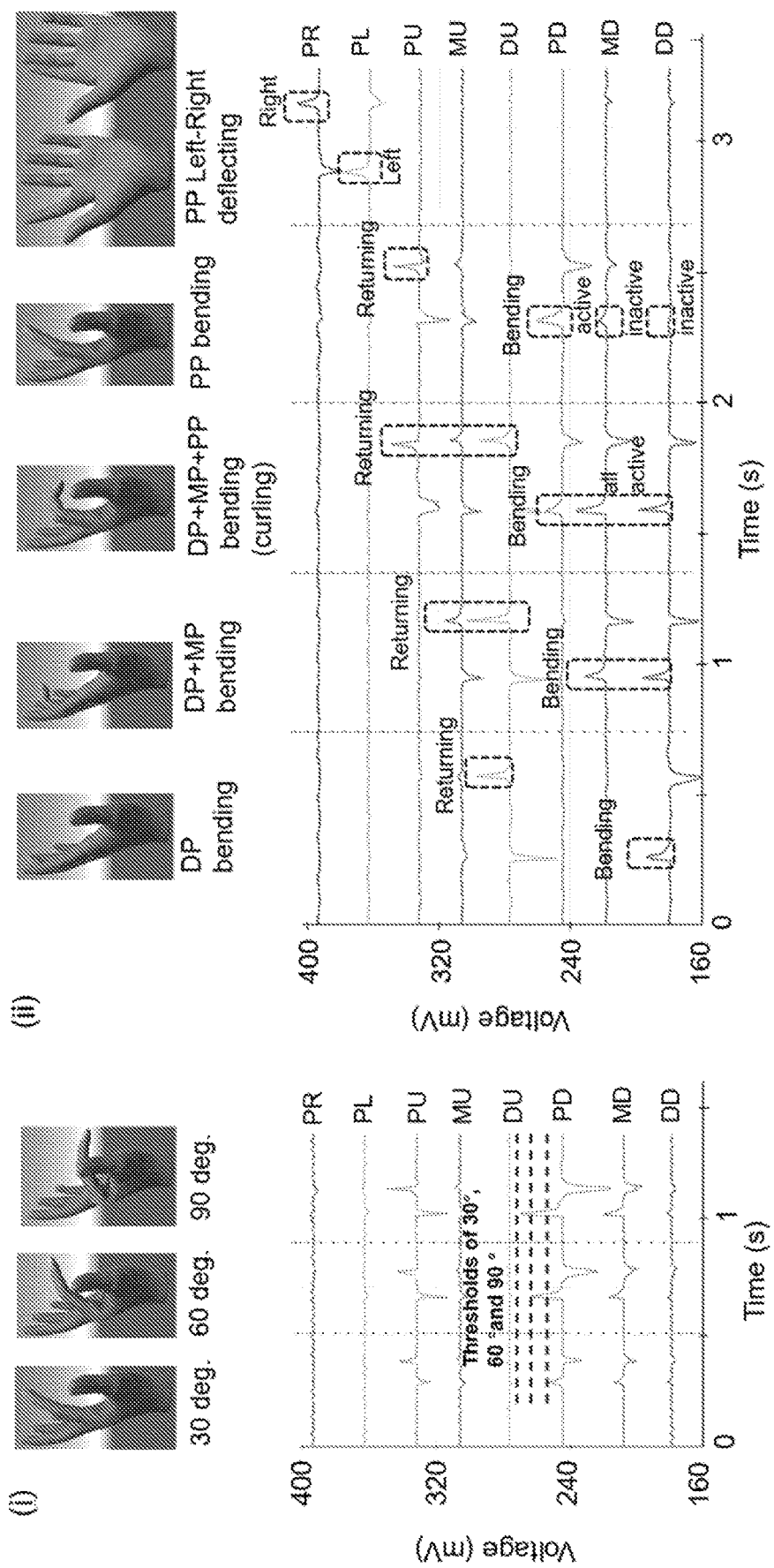
FIG. 8 illustrates (i) motions of a proximal phalanx in virtual space, and corresponding positive triboelectric outputs from eight exemplary sensors (DD, MD, PD, DU, MU, PU, PL, and PR) on an index finger with three distinguishable bending angles (30°, 60° and 90°), and a subsequent returning motion detected by positive signals of PU for each bending, (ii) motions of an index finger with three phalanges under DP bending, DP+MP bending and DP+MP+PP bending, and a subsequent returning motion detected by positive signals of DU, MU and PU for each bending, as well as left/right deflection of a proximal phalanx, the dashed lines and boxes indicating functional signals.

FIG. 8 illustrates a typical example of index finger bending. In this example, the real-time signal waveforms of eight finger bending triboelectric sensors were monitored. As mentioned before, the thresholds of specific bending angles (30°, 60°, 90°) were calibrated for the sensors from each phalanx, as shown by the dashed black lines on the signals of PD. At 30°, a positive triboelectric signal from PD was generated when bending the proximal phalanx and pressing PD, and a negative signal was also recorded on PU due to the separation event. The returning motion of the proximal phalanx led to the pressing of PU and induced a positive signal, while the separation of PD gave a negative signal. In an exemplary demonstration program, once the sensor output signal reaches a threshold (FIG. 8(i)), the program runs by a microprocessor in communication with the sensors will output a corresponding code e.g., "0,0,1,0,0,0,0,0" and "0,0,2,0,0,0,0,0" for 30° and 60° bending of PD, respectively, where the positions of each number represent different sensors.

Processing software, such as the Unity program, can receive the code output by the microprocessor as a command, for example, via a communication protocol of a serial port, and convert it into a motion of a virtual hand in virtual space. Alternatively, after the sensing signals are processed by the microprocessor, the command code can be used in any kind of control terminal, Unity being just one kind of gaming/demo development software, other similar engines including Unreal, etc. On the other hand, the code can alternatively or additionally be sent to a servo motor to control a robotic hand.

For validation of multiple DOF manipulation (FIG. 8(ii)), the functional signals are marked in dashed boxes, and all of the upper finger bending sensors, DU, MU, and PU, are in charge of the returning motion. Based on the real-time sensor signal waveforms, each bending activity was performed with a cycle of bending and returning. For instance, with the curling motion (bending of DP+MP+PP), all three finger bending sensors were triggered, with DP and MP sensors reaching the threshold of 60° and PP reaching 30°. This curling motion was projected into the virtual hand. Then, all three returning signals from the DU, MU and PU sensors were activated to set the finger back to its original position. A unified low threshold for these upper sensors was set to simplify the returning process.

Figure 9:
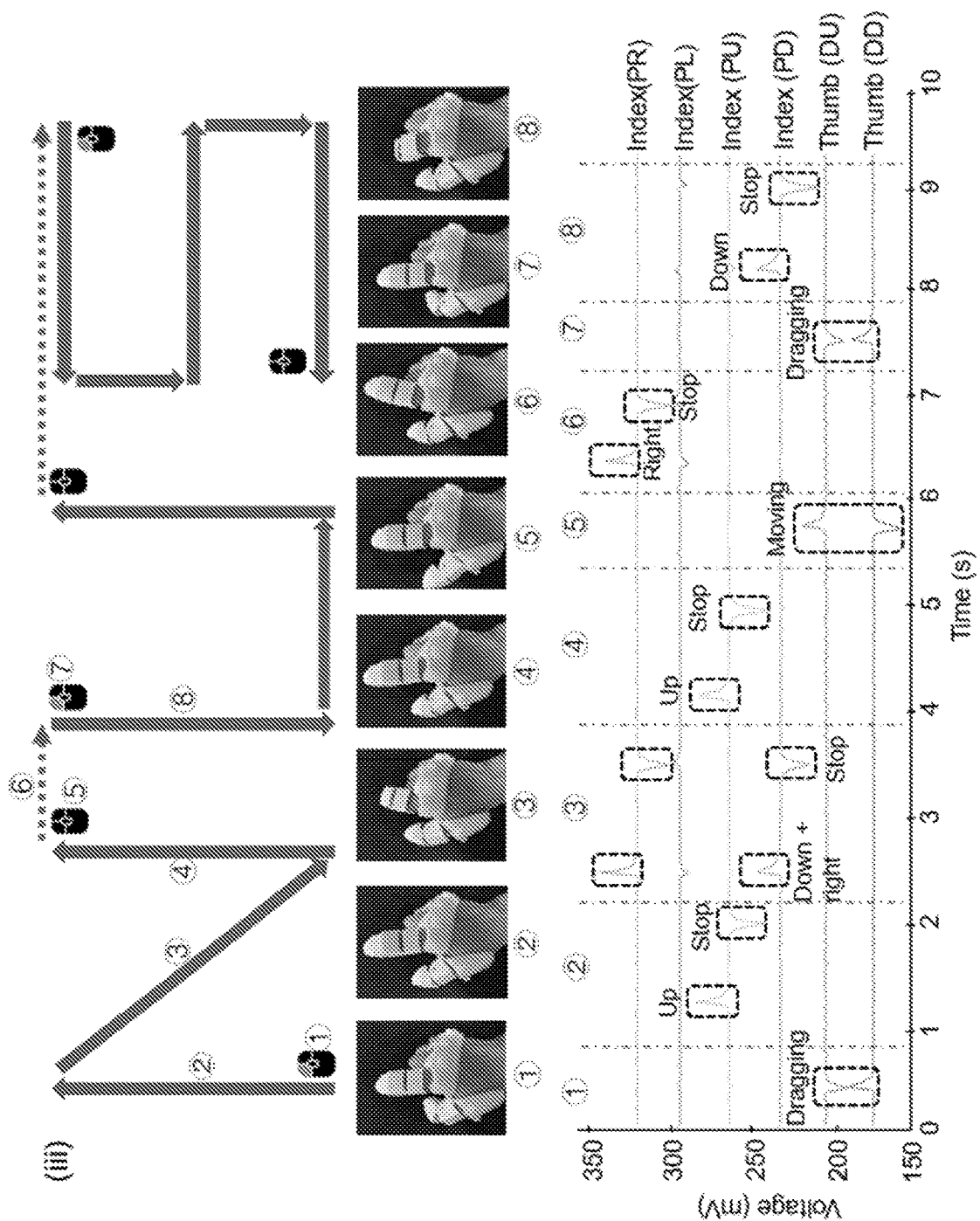
FIG. 9 illustrates schematics of alphabet writing, with photos of finger motions and corresponding exemplary triboelectric output signals for (1) activate dragging, (2) upward writing and stop, (3) down+right writing and stop, (4) upward writing and stop, (5) activate moving, (6) right moving and stop, (7) activate dragging and (8) downward writing and stop.

By converting the index finger into a virtual pointer to imitate the motions of a cursor, the glove described herein may also provide "mouse control". This was demonstrated using online shopping and alphabet writing (see FIG. 9). In addition to the motions in eight directions determined using the four finger bending sensors of the proximal phalanx of the index finger, the functions of scroll, drag, and click were assigned to the middle finger and the thumb respectively. As shown in FIG. 9, the dragging mode was initiated by a positive peak resulting from the bending of the thumb as detected by DD (step 1: activate dragging). The index finger was then used to write the alphabet (step 2: upward writing and stop). For the alphabet writing process, the positive and negative peaks output from the finger bending sensors corresponding to bending and releasing actions were responsible for the commands of start and stop respectively, and diagonal writing (step 3: down+right writing and stop; step 4 upward writing and stop) was achieved by pressing both PD and PR sensors based on the writing motion of the finger. After finishing writing the first letter (N), the thumb was then returned and pressed DU to initiate a moving mode of the cursor (step 5: activate moving), in which the motions were again controlled by the index finger (step 6: right moving and stop; step 7: activate dragging; step 8: downward writing and stop).

Fabrication of an Exemplary Elastomer-Based Triboelectric Finger Sensor

Figure 10:
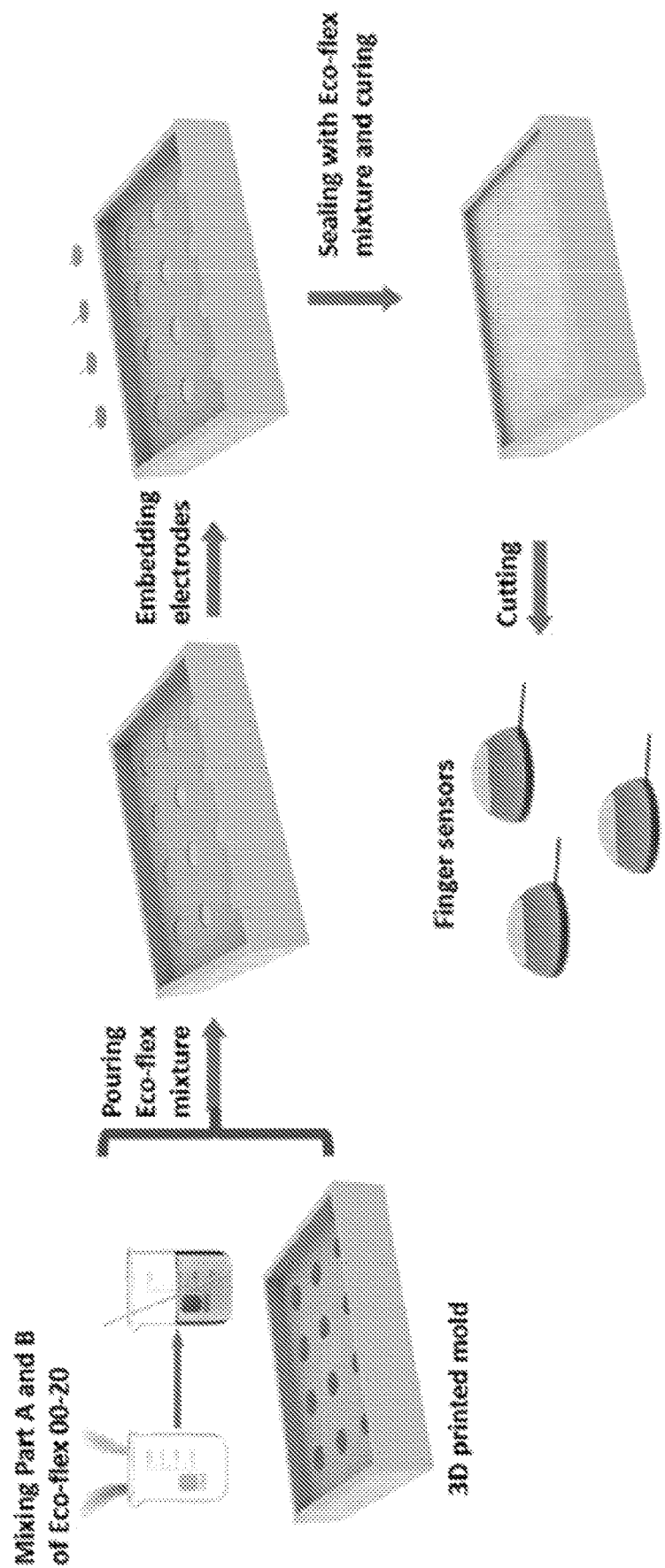
FIG. 10 illustrates schematics of an exemplary fabrication process of an elastomer based triboelectric finger sensor.

In one non-limiting and exemplary method of fabrication, illustrated in FIG. 10, three 3D printed hemispheric molds (made for example using an Anycubic 4 Max Pro printer) were prepared, each having a different hemispheric diameter (i.e. 3 mm, 3.5 mm and 4 mm). A mixture of solution A and B, both of Eco-flex (ratio:1:1, model: 00-20) was poured into each mold, and cured at room temperature for 90 minutes to form the hemispherical contact portion of the finger bending triboelectric sensor. Aluminium foil (for example, of around 50-100 μm thickness) was cut into circles to fit the size of each hemisphere. The foil was bonded with wires (for example, of around 0.2-0.5 mm diameter) to form the embedded electrode portion of the exemplary finger bending sensor. The electrodes were then attached to the flat bottoms of the cured Eco-flex hemispheres, and covered with an additional mixture of Eco-flex. After a second curing, the fabricated elastomer finger bending sensors were released from the molds and bonded onto an inner surface of glove finger cases using adhesive epoxy, or the like. The same approach was used to fabricate finger bending sensors made from PDMS (e.g. Sylgard 184, Dow Corning) for comparison purposes, as discussed above, using a ratio of 10:1 for the mixture of substrate and curing agent, and a curing temperature of 70° C. for 60 minutes.

Triboelectric Palm Sensor

Another triboelectric sensor located approximately at the centre of a palm portion of the glove-based HMI can be used to sense normal force and shear (sliding) force, caused by contact with an external object, in eight directions. Unlike the above-described finger bending sensors, the electrode portion for the palm sensor is provided with four quadratic segments or pads. The segments are separated in order to clearly identify the direction of an external force. In further examples, more than four segments may be provided, thereby increasing the number of detectable directions.

Figure 11:
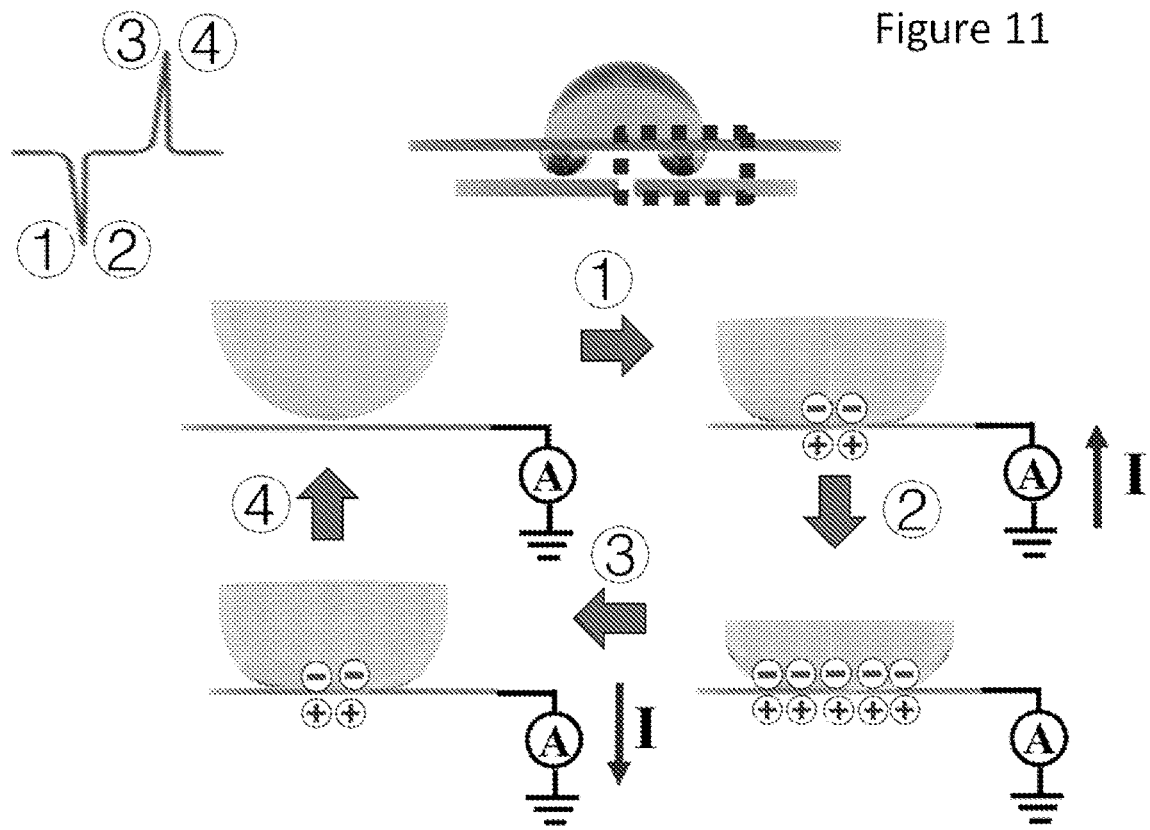
FIG. 11 illustrates waveform output from an exemplary triboelectric sensor and corresponding deformation of an exemplary triboelectric palm sensor.
Figure 12:
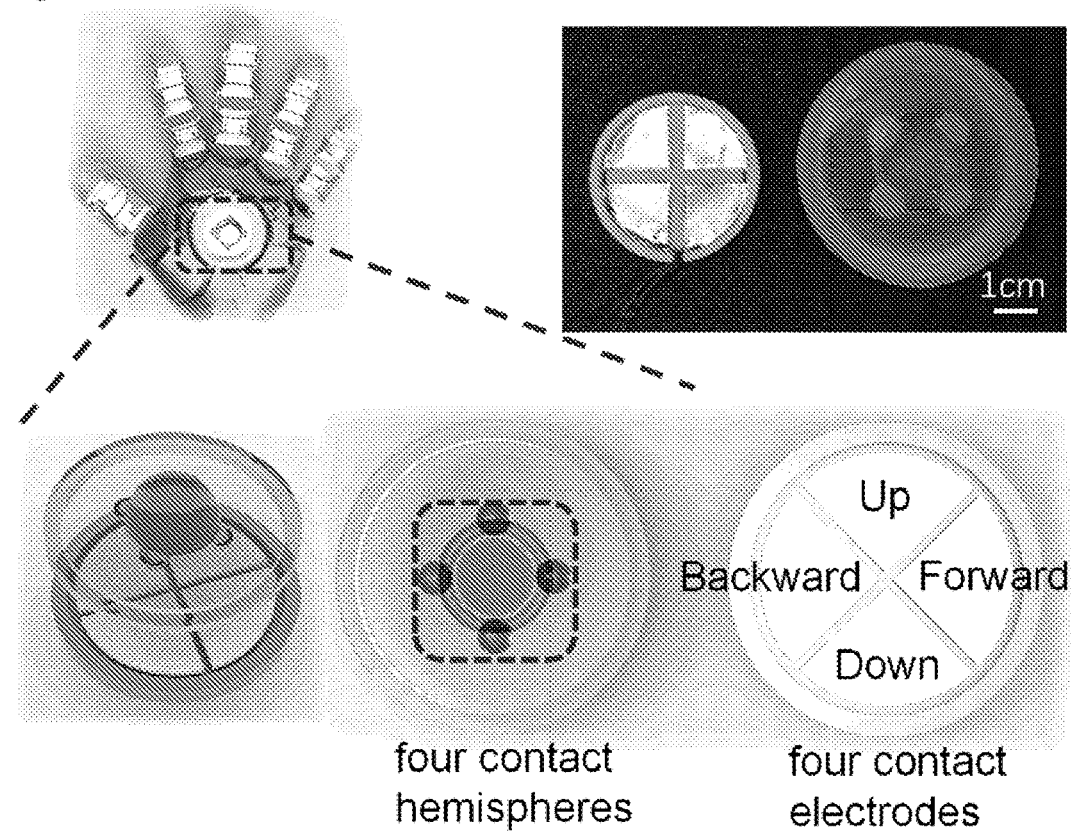
FIG. 12 illustrates components of an exemplary triboelectric palm sensor.

In one example, shown in FIG. 11, an upper contact portion of the palm sensor, also referred to herein as a membrane or upper dome, is made from polydimethylsiloxane (PDMS) elastomer. The contact portion has a large dome shape of approximately 15 mm diameter. Additionally, within the upper dome are provided four smaller lower hemispheres (each of approximately 3 mm diameter) forming a lower contact portion of the palm sensor i.e. a bottom layer. The four smaller lower hemispheres act as respective contact points for the four corresponding electrode pads in the electrode portion below (FIG. 12). The four electrode pads are separated from the upper contact portion of the palm sensor (i.e. the upper dome) by about 3 mm.

The triboelectric palm sensor utilizes the elastomer and the electrode, rather than the skin of the finger and the electrode, as the negative and the positive triboelectric materials, respectively. The electrode will extract positive charges from the ground to balance the negative charge from the elastomer of the smaller hemispheres during contact between the two. Hence, a negative output is generated instead of the positive output caused during contact for the above-described triboelectric finger sensors. This difference in the signals output from the triboelectric palm sensor and triboelectric finger sensors may be useful for various applications.

For the palm sensor, as illustrated in FIG. 11, an external impact on the top of the large upper dome will cause deformation of the dome, consequently leading to deformation of at least one of the smaller lower hemispheres within the dome. As illustrated in FIG. 12, typically the dome portion of the sensor faces outward from the wearer's palm while the electrode portion is located closest to the user's palm.

Where the external impact is a shear force (i.e. a forward sliding motion) the direction of deformation of the upper dome will cause the forward lower hemisphere to deform more than the other three lower hemispheres and will result in a larger triboelectric output from the corresponding electrode (i.e. the electrode that comes into contact with the deformed lower hemisphere), providing an indication of the shear force direction.

Figure 13:
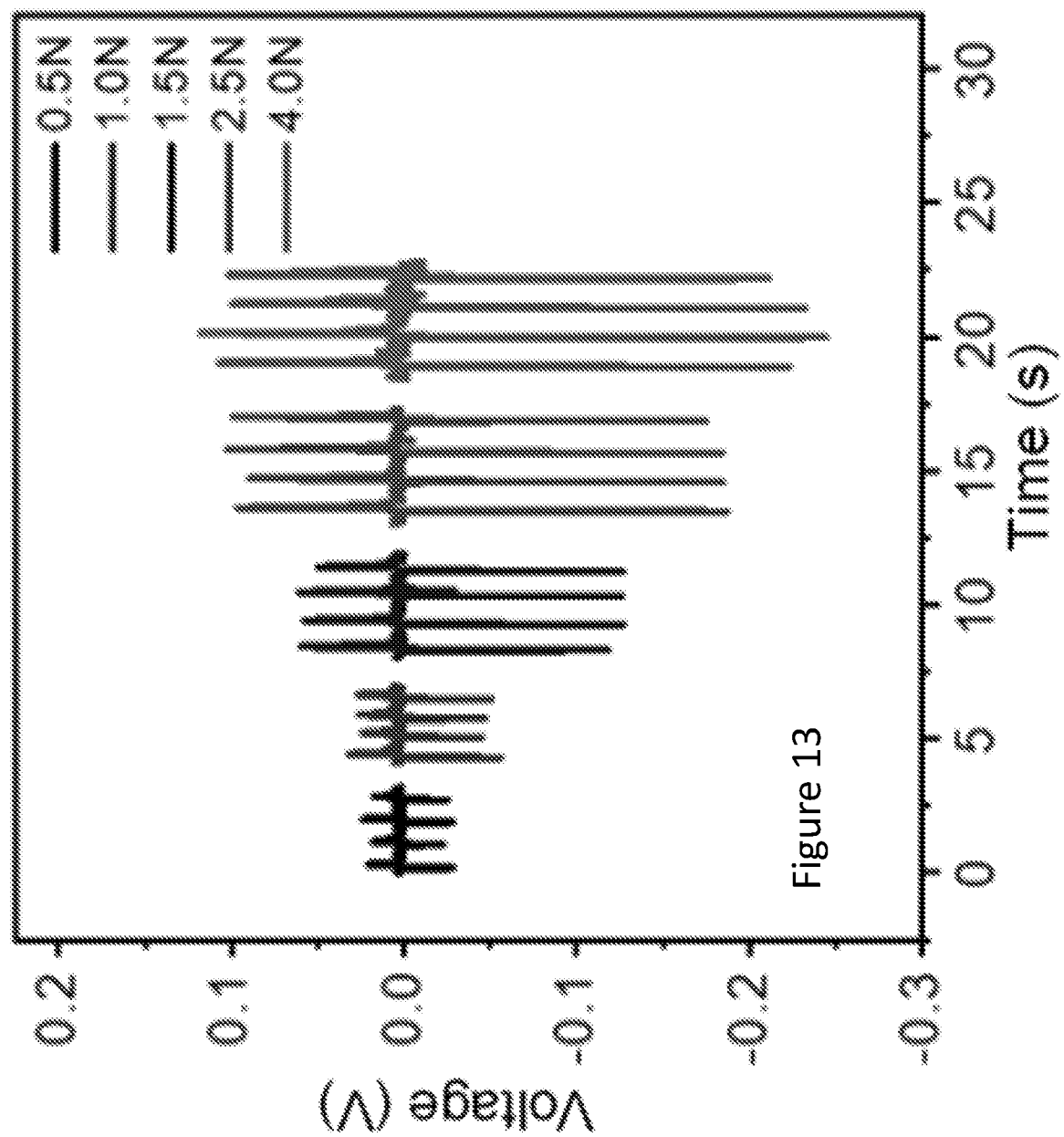
FIG. 13 illustrates a relationship between changing loading force and a triboelectric output from a single exemplary electrode of a palm sensor under 2 Hz frequency.

A normal force (i.e. a downward motion) can be determined by the amplitude of the negative triboelectric output as shown in FIG. 13, which illustrates a relationship between the changing loading force (N) and the triboelectric output from a single electrode under 2 Hz frequency. As the most "normal" forces do not contact the sensor in a purely normal direction (i.e. at exactly ninety degrees), the four-quadratic design of the exemplary triboelectric palm sensor can be utilized for simultaneous measurement of all four outputs to identify the lateral direction of the applied force, i.e., the shear force as a decomposed part of the "normal" force. Similarly, a typical forward pushing (shear) force will not only generate a signal from the forward sensor (electrode), but will also generate some smaller signals from other three sensors (electrodes). To this end, four standard directions are defined: upward, downward, forward and backward, based on straight fingers pointing towards the front, and the center of the palm pointing to the left or right side. The output data in FIG. 15 indicates that, a total of eight directions ((i) up, down, forward and backward; (ii) down+forward, up+backward; down+backward, and up+forward) can be detected, including the four standard directions sensed by each quadrant of the electrode portion individually, and the other four diagonal directions measured by two adjacent quadrants. In processing the output signals, a comparison code for the triboelectric outputs from the four electrodes is implemented to assist in the identification of the direction of the force, i.e., direction judgement is carried out by the microprocessor and/or the processing software if one or two outputs show much larger amplitudes than the others.

Figure 14:
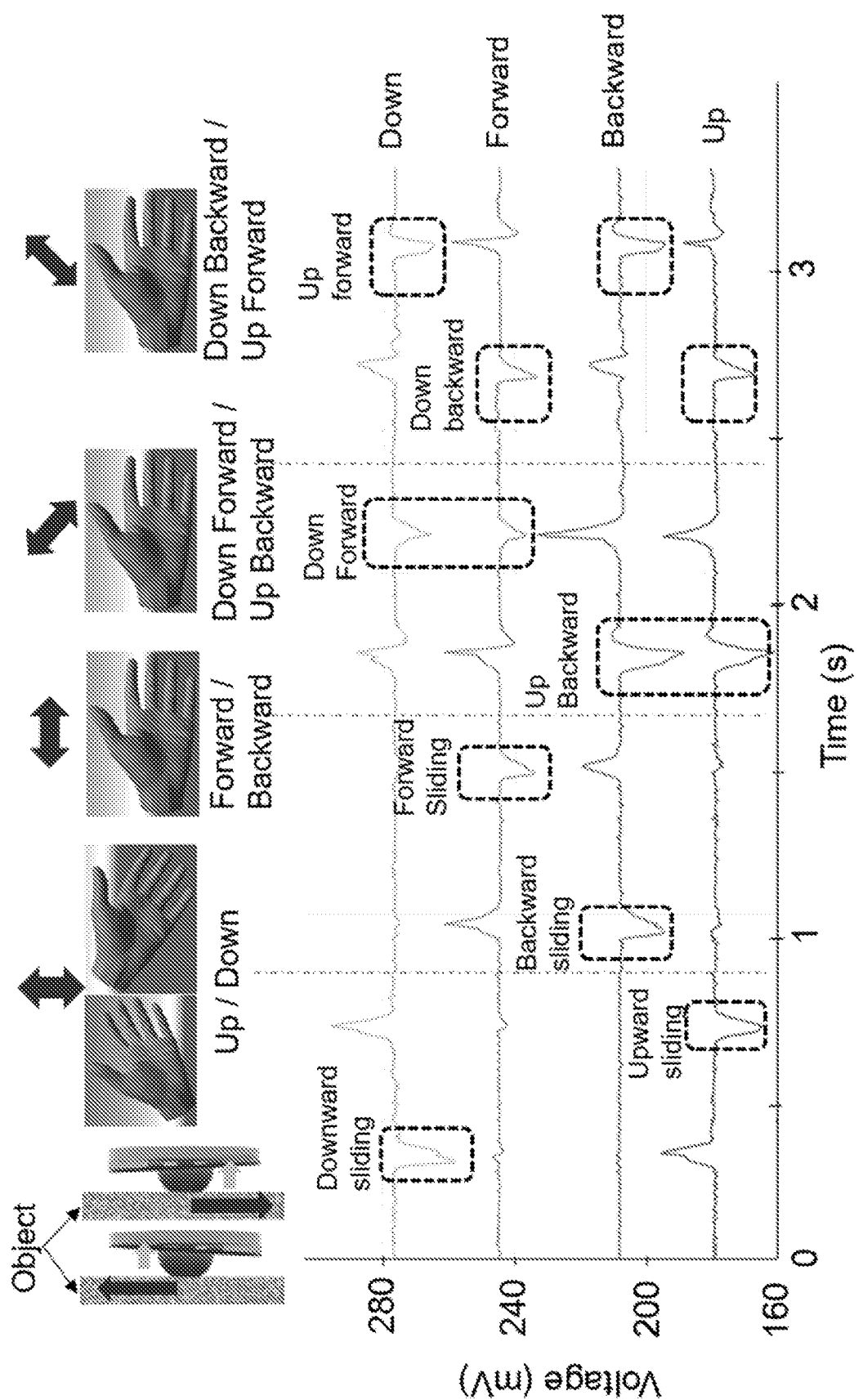
FIG. 14 illustrates motions of a hand in virtual space during interactions with external objects in eight directions, and corresponding output from an exemplary triboelectric palm sensor, the dashed boxes indicating functional signals.
Figure 15:
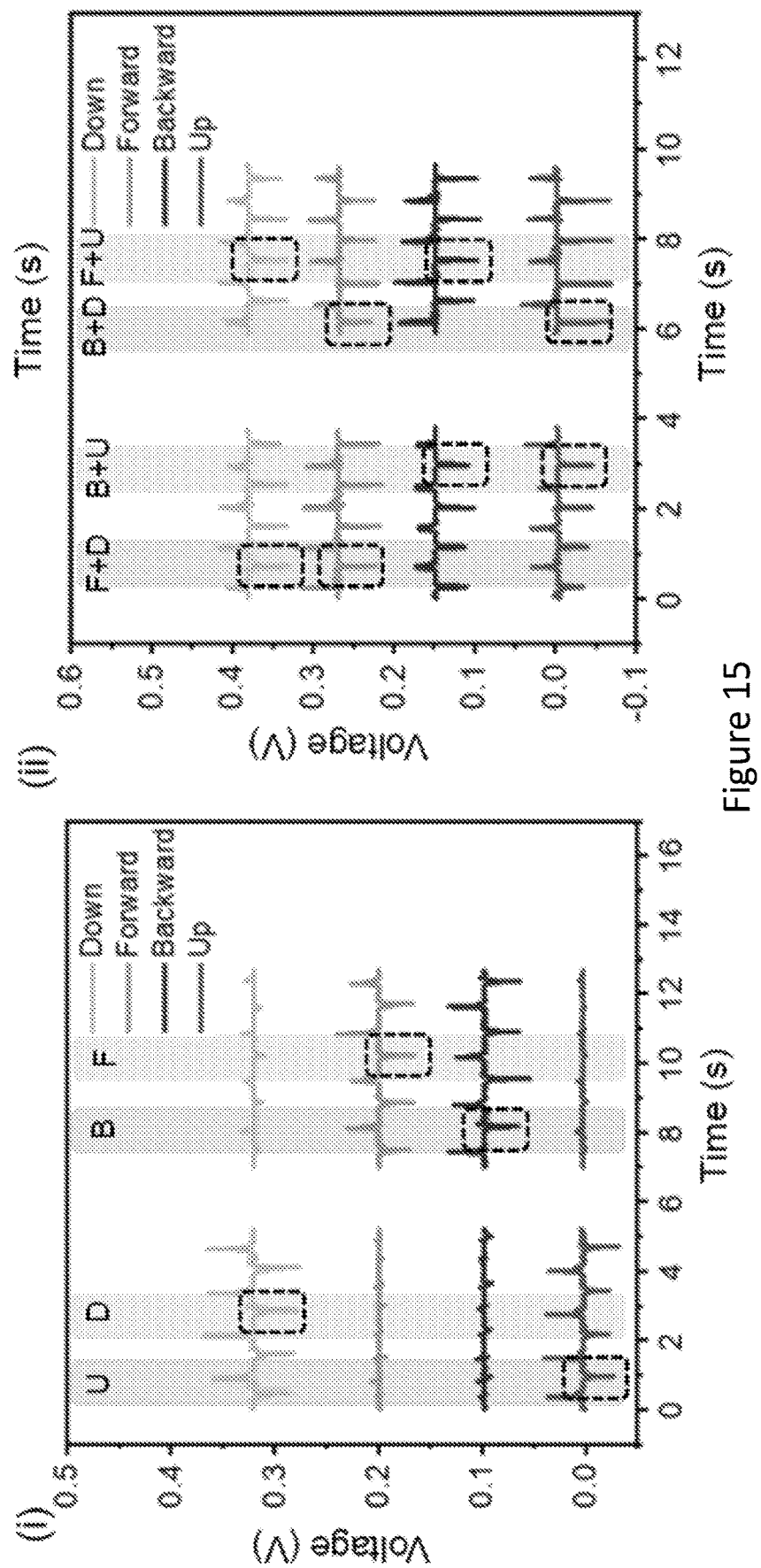
FIG. 15 illustrates triboelectric outputs from four electrodes (up, down, forward, backward) under pushing of a top dome of an exemplary triboelectric palm sensor in eight directions, (i) up, down, forward and backward, and (ii) down+forward, up+backward, down+backward and up+forward, negative signals in the dashed boxes indicating activated sensors.

In FIG. 14, by sliding the palm sensor across an external object, a demonstration using a virtual hand in virtual space shows the functions for defining entire hand motions. For example, the downward sliding of the palm sensor induces the contact of the electrode in charge of downward sensing and the separation for the electrode of upward sensing at the opposite side, and leads to one negative and one positive signal respectively. For diagonal motions, such as up+backward, the sliding caused the contacts of two adjacent electrode portions for sensing up and backward motions and the separation from the two opposite electrodes, and hence, generated two positive and two negative signals. The characterized data were tested under a pure lateral force exerted on the top of the dome in order to obtain the featured outputs.

The detection of external impacts, in addition to recognizing finger motions of the hand, assists in enhancing the user's experience for VR/AR applications.

Fabrication of an Exemplary Elastomer-Based Palm Sensor

Figure 16:
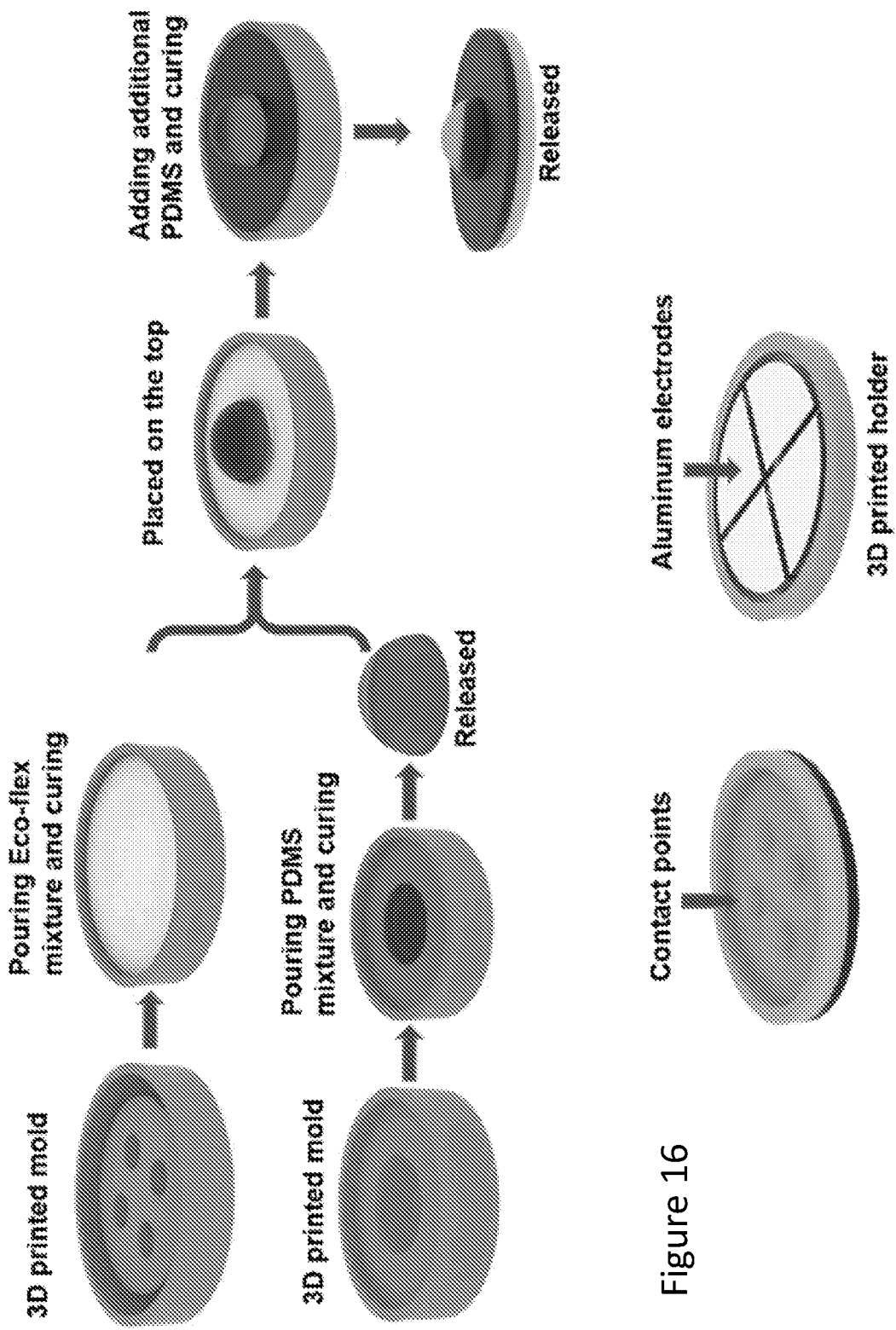
FIG. 16 illustrates schematics of an exemplary fabrication process of an elastomer based triboelectric palm sensor: (top) top contact points and (bottom) backside view of the top contact points, and top view of bottom aluminium electrodes.

In one exemplary and non-limiting method of fabrication, see FIG. 16, two 3D printed molds (manufactured, for example, using an Anycubic 4 Max Pro printer) were prepared for the upper contact portion of the palm sensor i.e. the upper dome, or button, and for the four triboelectric contact points (hemispheres) forming the lower contact portion. A mixture of solution A and B of Eco-flex elastomer (ratio: 1:1, model: 00-20) was poured into the mold for the four hemispheric contact points, and a mixture of PDMS (ratio:10:1, Sylgard 184, Dow Corning) was poured into the mold for the upper dome. After curing, the upper dome was released and placed on the top of the cured four hemispheric contact points. An additional mixture of PDMS was then poured onto the two parts (i.e. the dome and the four contact hemispheric points) to bond them together. After a second curing, the entire unit was released from the mold. A holder of the four bottom electrode pads was 3D printed (for example, using an Anycubic 4 Max Pro printer). A round shaped aluminium foil was cut into four quadrants and bonded with wires, and attached onto the holder.

Piezoelectric Mechanical Stimulators

Also included in the glove-based HMI described herein is at least one piezoelectric (PZT) haptic mechanical stimulator. In one non-limiting example, five PZT stimulators are included in the glove, preferably in the form of thin PZT chips. The PZT chips may be placed at the root of each finger case/case segment and at the root of the thumb case/case segment for providing haptic feedback to a wearer of the glove. It will be appreciated that additional or fewer PZT stimulators may be included in the glove, depending upon the specific application. For example, the thumb case/segments and/or one or more of the fingers cases/segments may have more than one PZT stimulators, or no PZT stimulators.

To perform haptic mechanical stimulation, a converse piezoelectric effect is applied on the PZT stimulators. Once an interaction event is triggered (i.e. a normal or shear force is applied to the glove, and/or finger bending/curling/deflecting occurs), a microcontroller in data communication with the glove will send a Pulse Width Modulation (PWM) signal with a resonant frequency to actuate vibration of one or more of the PZT stimulators. In one example, the intensity of vibration (i.e. mechanical stimulation) can be tuned to reflect the degree or intensity of the interaction. The interaction event may be customised according to the specific application.

Figure 17:
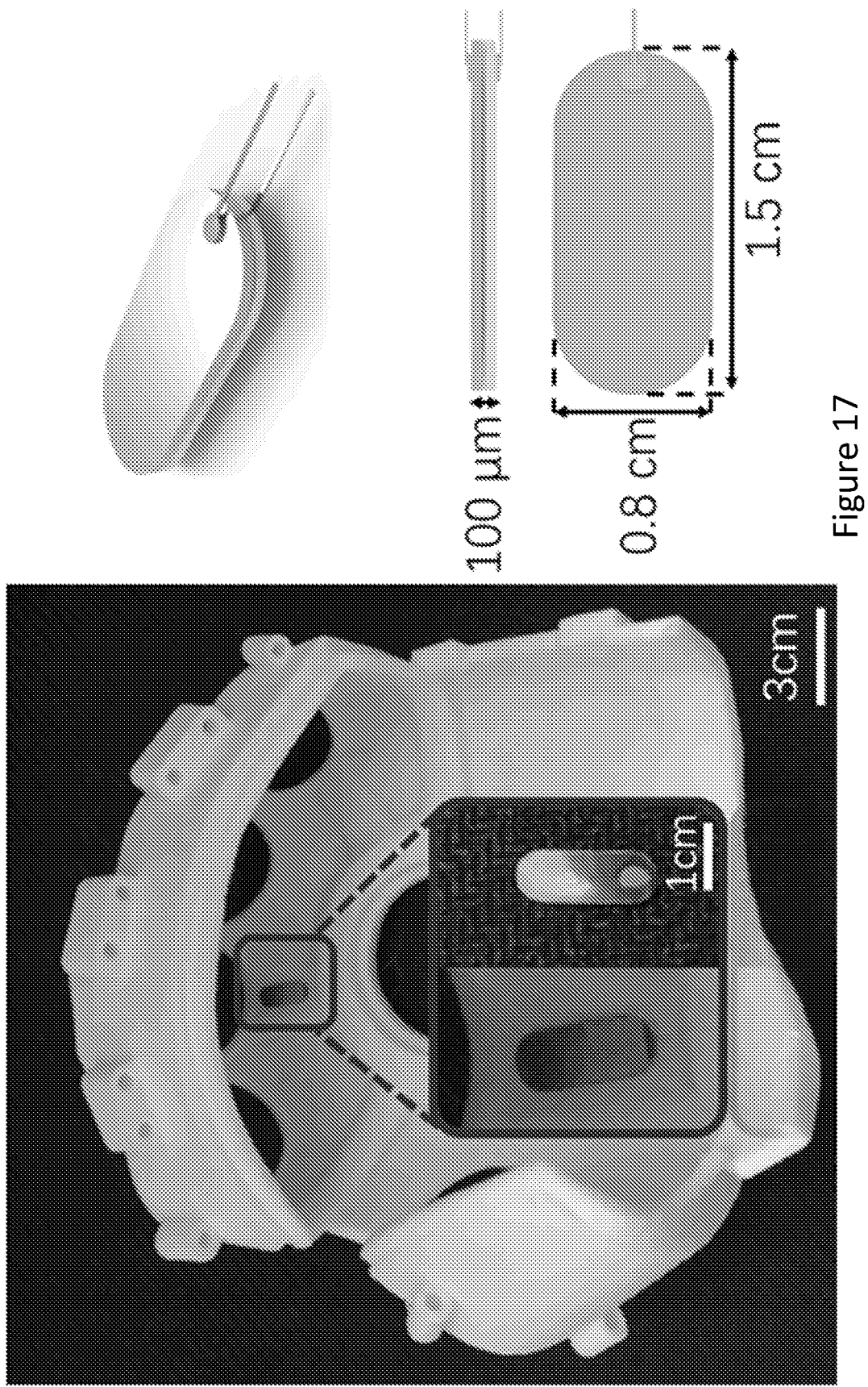
FIG. 17 illustrates an exemplary piezoelectric (PZT) haptic stimulator.

The intensity of the mechanical stimulation provided by the PZT stimulators can be tuned by controlling the input voltage from 6 V to 12 V (e.g. providing a voltage of 6V, 8V and 10V). The resonant frequency is determined as 270 Hz based on the dimensions of the PZT chip. As illustrated in the example of FIG. 17, an exemplary PZT chip may be attached to a part of a glove case (for example, a palm portion to which finger and thumb cases may be attached, as illustrated). The exemplary chip may be approximately 1.5 cm in length, approximately 0.8 cm in width, and may have a thickness of approximately 100 μm. Of course, the dimensions and location of each PZT chip may be varied according to the specific application. Where more than one PZT chip is provided in a glove case, the multiple PZT chips need not necessarily have the same dimensions.

Figure 18:
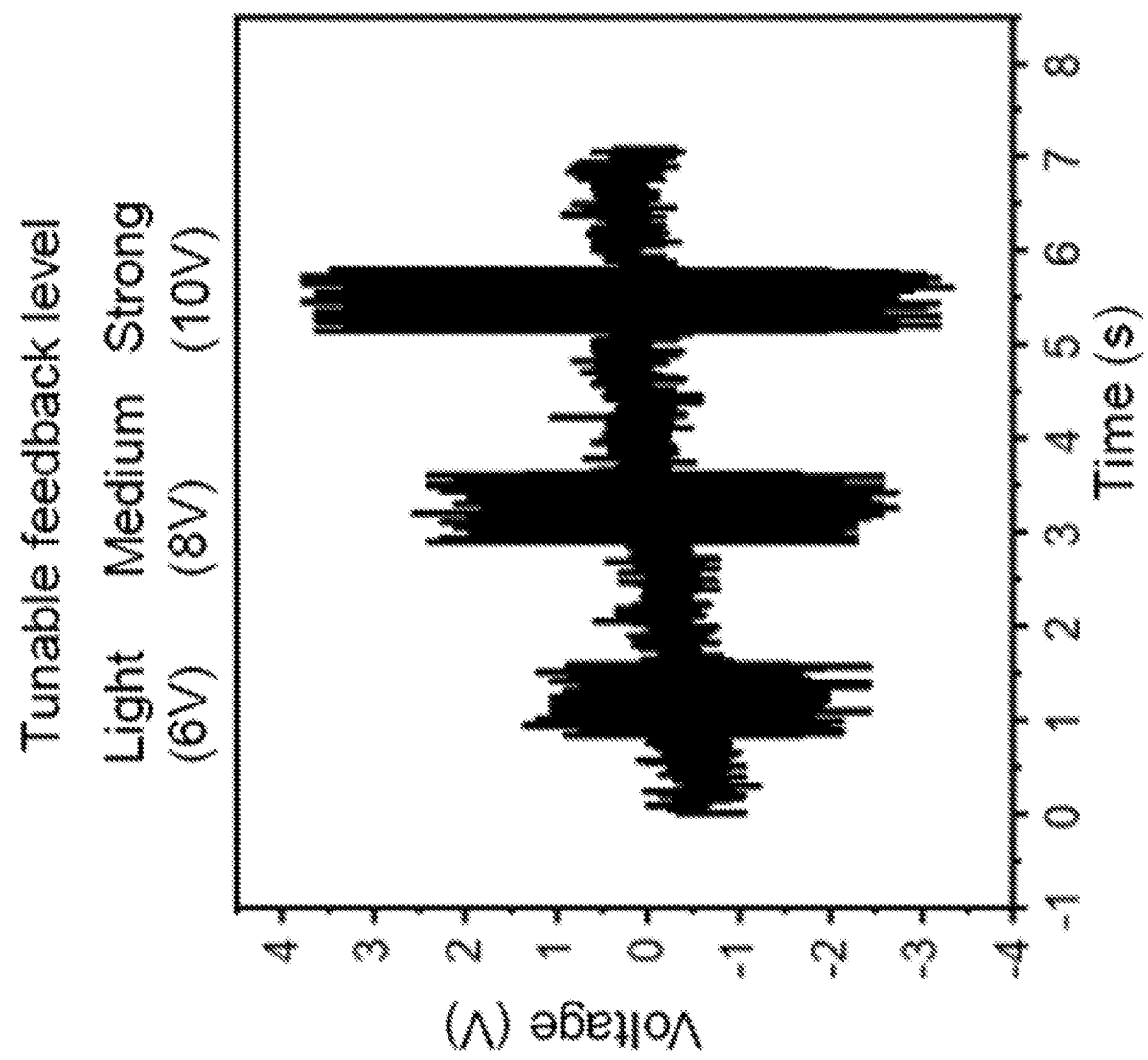
FIG. 18 illustrates stimulation using a second PZT chip for tunable input AC power (6V, 8V and 10V) at a frequency of 270 Hz.

In one example, three levels of mechanical stimulation intensity (6V, 8V, 10V) may be set for activation of the mechanical haptic stimulation, as illustrated in FIG. 18. In this example, two PZT chips were bonded together, and one PZT chip was used to convert the mechanical stimulation produced by the other PZT chip back into electricity via the piezoelectric effect. This enabled the real-time stimulation to be visualized and also provided a check on the intensity of stimulation.

Figure 19:
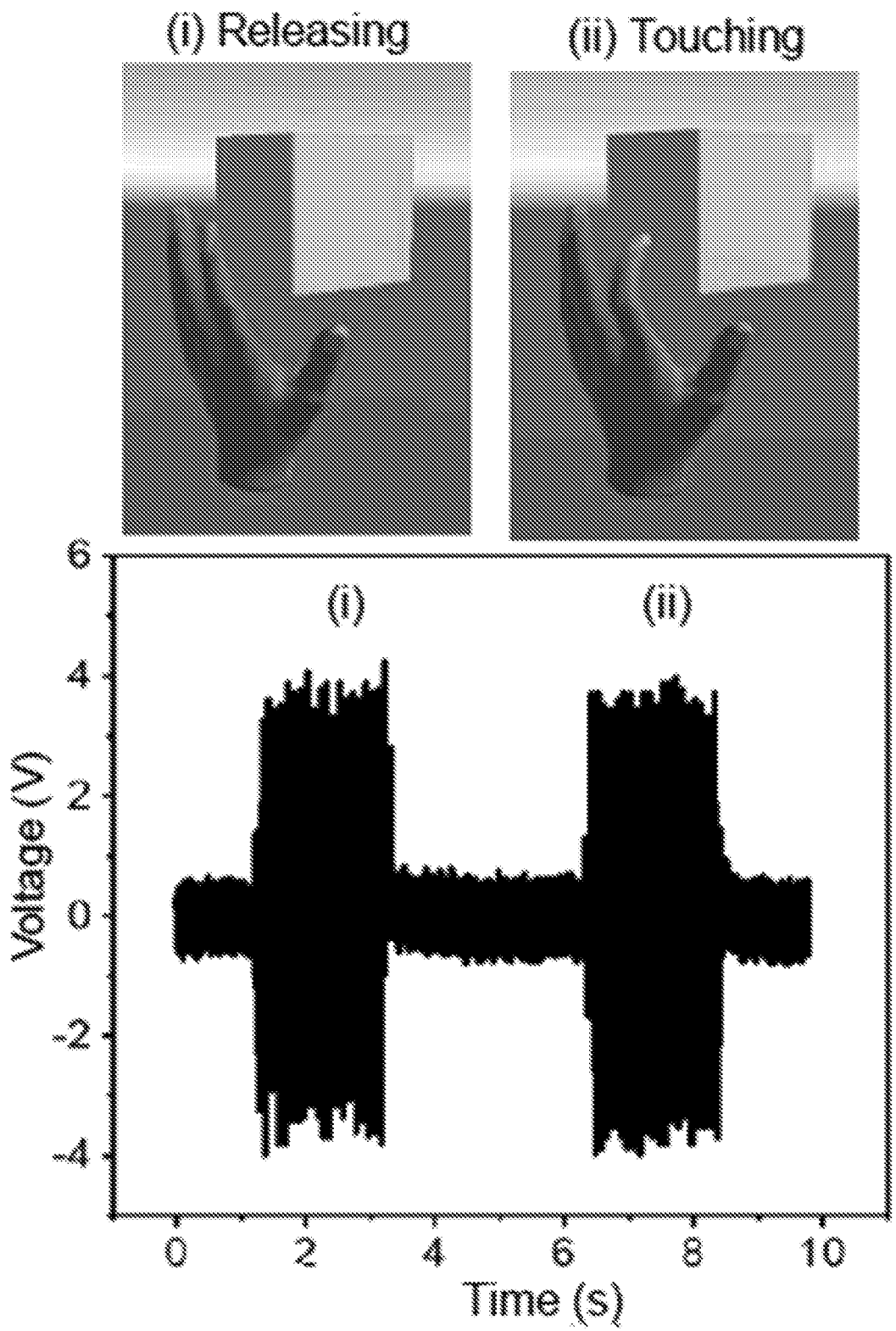
FIG. 19 illustrates a demonstration of real-time haptic feedback in response to an interactive event in Unity, with the measured output of mechanical stimulation.

As depicted in FIG. 19, processing software run by or in communication with a microprocessor linked to the glove (in this case the Unity software collision reactor module) enabled the delivery of virtual collision events back to the microcontroller through a serial communication port, and the activation of mechanical stimulation via a programmed PWM input. As a result, contacting and releasing events (see FIG. 19) between the glove and external objects (real or virtual) can be immediately fed back to a user of the glove via vibration of the PZT mechanical stimulators with tunable intensity to distinguish between events of different degrees (e.g. light, medium and strong events).

In one example, feedback may be delivered to the user (i.e. the wearer of the glove) by one or more of a plurality of PZT mechanical stimulators.

Fabrication of an Exemplary PZT Chip

Figure 20:
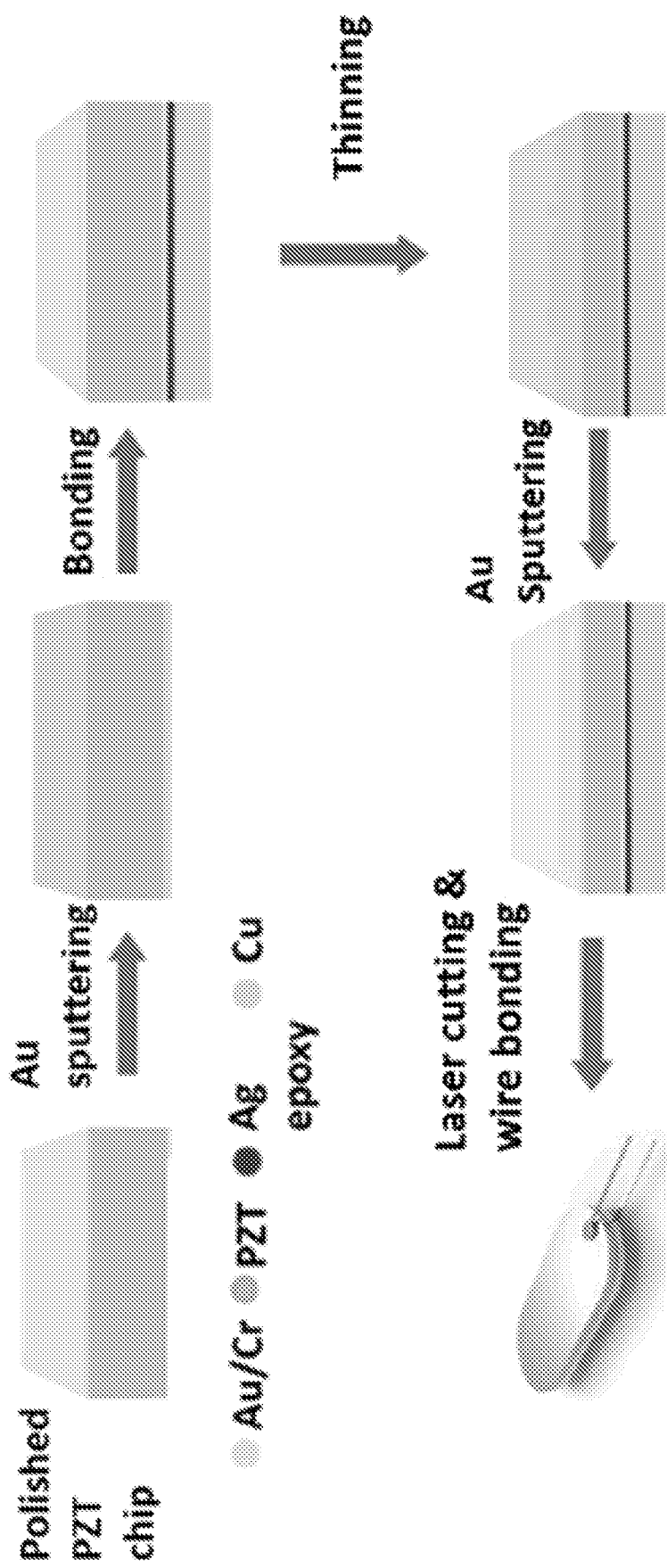
FIG. 20 illustrates schematics of an exemplary fabrication process of a PZT actuator for haptic feedback.

In one exemplary and non-limiting method of fabrication, see FIG. 20, a 1.5 cm×1.5 cm lead zirconate titanate (PZT) ceramic (e.g. Fuji ceramics Incorporation, C-591 6) and 50 μm beryllium copper foil were polished. After sputtering of Cr/Au (Cr: 20 nm, 100 W, 2 mins; Au: 200 nm, 100 W, 5 mins) to form a bottom electrode on one side (bottom surface) of the PZT ceramic, the electrode was bonded with copper foil using conductive silver paste and baked in a vacuum oven (3.5 hours at 175° C.). Then, the bonded PZT chip was thinned down to 20 μm by chemical mechanical polishing. The top Au electrode on the other side (top surface) of the PZT ceramic was then sputtered using the same approach. After that, the as-fabricated thinned PZT chip was further diced into a size of 8 mm×5 mm by laser cutting. Wires were then connected to both top and bottom electrodes using silver paste, followed by the encapsulation of the PZT chip using polyimide tape (e.g. 3M).

Exemplary Glove Case Fabrication and Assembly

In one non-limiting example, the finger/thumb cases and palm case (see FIG. 17, for example) of the glove are fabricated separately, for example, using 3D printing, optionally using an Anycubic 4 Max Pro printer, preferably using polylactic acid (PLA). The printed cases are then polished in preparation for the bonding of the various sensors. To assemble the separate finger/thumb cases with the palm case, metallic alloy wires with a certain restoring force were used as connectors, so that the entire assembled glove case can be supported during finger/thumb bending, thereby enabling deformation of the respective finger bending and palm sensors. It will be appreciated that the various sensors and feedback devices may be attached or bonded to the glove cases in a variety of ways. While in general the feedback devices are attached to an interior of the glove case elements, this need not be the case. In a further example, the glove case may be formed integrally. Further cases or coverings may be added to the glove to provide protection to the sensors and/or feedback devices, comfort to the user, or for aesthetic appearance. The sensors and/or feedback devices may be assembled into one or more assemblies prior to or after attachment to the glove cases(s). Although various elastomers have been described for use in fabricating the sensors/glove cases(s), it will be appreciated that this is not intended to be limiting and that other suitable materials, or combinations of materials, may be used.

In the examples described herein, the output voltages of the triboelectric sensors (finger and palm) and PZT chips were typically measured by oscilloscope (e.g. Agilent, InfiniVision, DSO-X 3034A). Calibrations of output voltage against force for the triboelectric sensors were conducted by force gauge (e.g. Mecmesin, MultiTest 2.5-i) with a speed of 900 mm/min.

Machine Learning Based Object Recognition

As previously discussed, machine learning techniques may be used to expand the glove's functionality, enabling performance of complex tasks such as object recognition.

In one example, for machine learning based object recognition using triboelectric outputs, sixteen triboelectric sensors of a right-hand glove were monitored simultaneously. Based upon typical finger usage for general tasks, these sixteen sensors included thumb (DD and DU), index finger (DD, MD, PD and DU), middle finger (DD, MD, and PD), ring finger (DD, MD, and PD), pinky finger (DD, MD, and PD) and palm, the thumb and the index finger being the most frequently used fingers. Six objects with various shapes (i.e. rod, cube, disk, curved structure/moon, pyramid, and small cube) were selected to be grabbed while recording the triboelectric sensor output from the palm and finger bending sensors.

The combined dataset from sixteen sensors (channels) can form a spectrum to provide enough features to be extracted automatically using machine learning, i.e. the raw data which contains various important information relating to a dynamic grabbing process, e.g. finger bending speed, contacting force between fingers and sensor arrays, sensors' triggering sequence and the operation manners for a specific user, can be fed into a training model (neural network) directly without a pre-processing step (e.g. normalization and segmentation, etc.). In other words, the general features of signal patterns across the entire sixteen sensors were used as direct inputs to the machine learning technique for object recognition.

Figure 21:
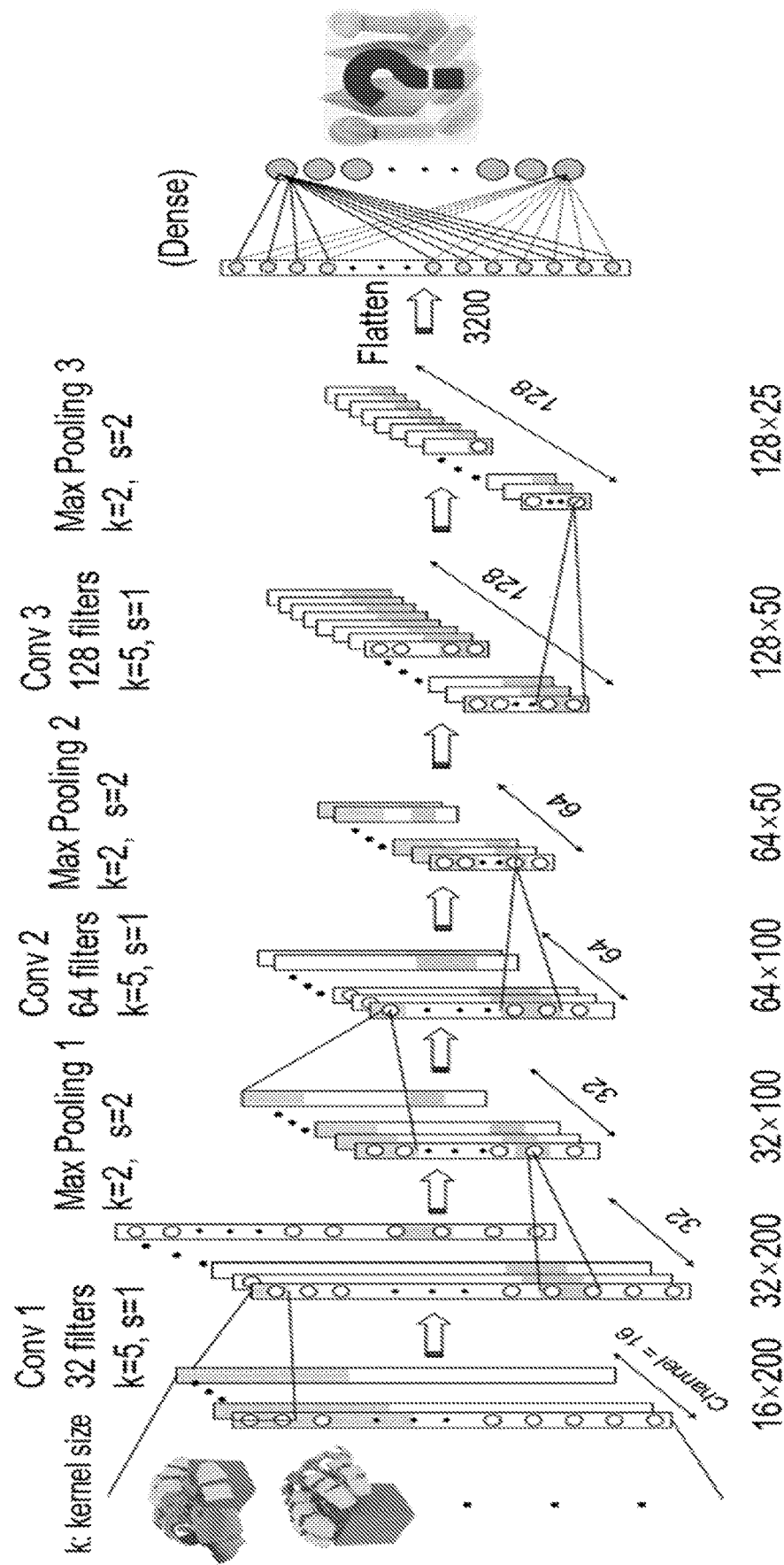
FIG. 21 illustrates schematics of an exemplary process and parameters for constructing a CNN machine learning technique.

Convolutional Neural Network (CNN) is a very effective method to derive interesting features from shorter (fixed length) segments. FIG. 21 illustrates the process and parameters used to construct a CNN model, further details of which can be seen in FIG. 33. The constructed CNN model includes three convolutionary layers with 32/64/128 filters, and three pooling layers. For the operation of each layer, the parameter k refers to the kernel size and s refers to the stride. For the training sample collection, each of the above sixteen triboelectric sensors had 200 data points recorded per sample to train the model for object recognition. For each object, 500 samples were collected for training (80%) and testing (20%).

Figure 22:
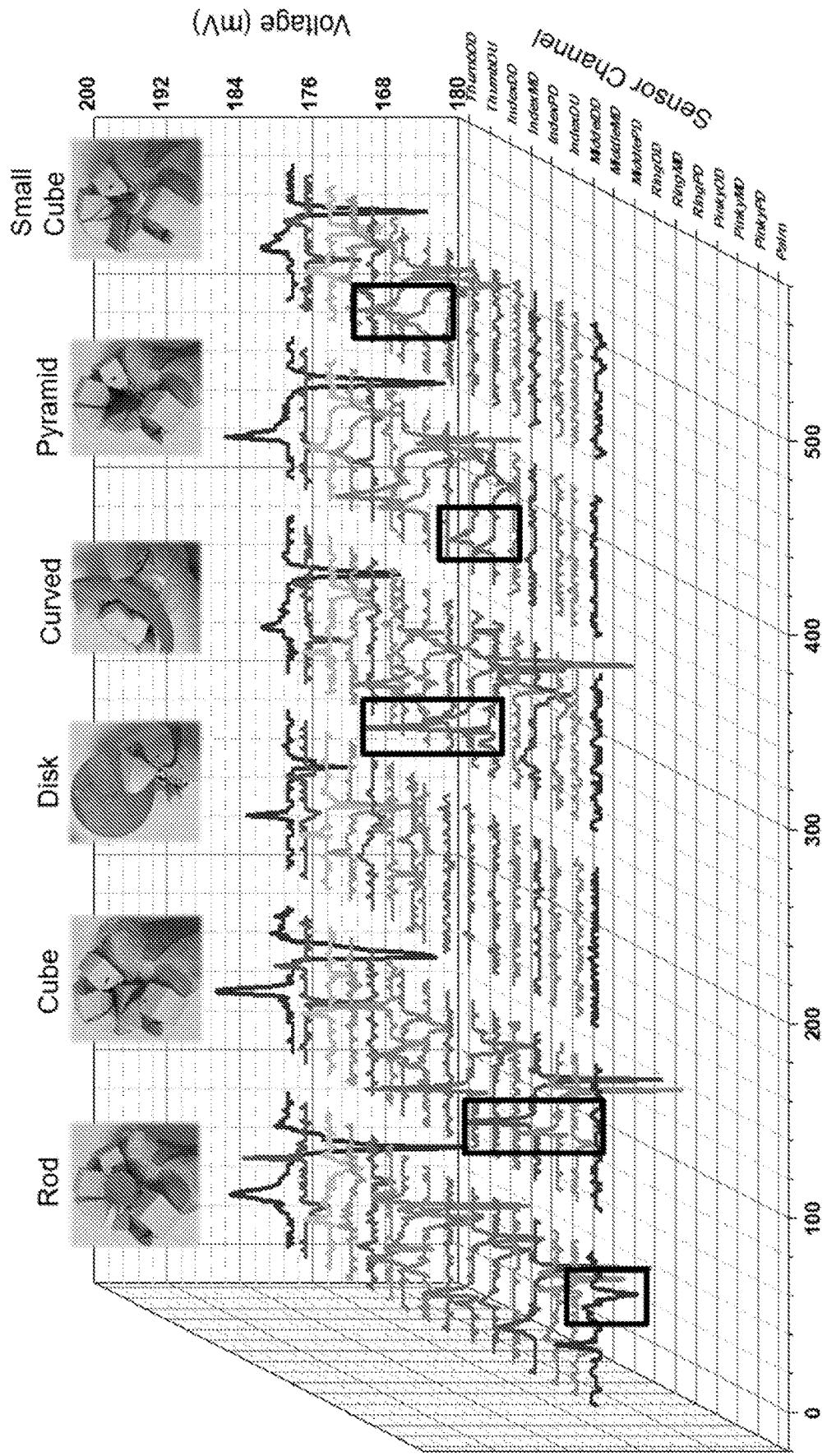
FIG. 22 illustrates triboelectric outputs from 16 exemplary triboelectric sensors: thumb (DD and DU), index finger (DD, MD, PD and DU), middle finger (DD, MD, and PD), ring finger (DD, MD, and PD), pinky finger (DD, MD, and PD) and palm (single electrode), during grabbing of six objects, including rod, cube, disk, curved object, pyramid, and small cube, the solid boxes indicating a featured pattern for recognition training.

The typical triboelectric outputs from the sixteen sensors (thumb (DD and DU), index finger (DD, MD, PD and DU), middle finger (DD, MD, and PD), ring finger (DD, MD, and PD), pinky finger (DD, MD, and PD) and palm (single electrode) for grabbing all six objects are shown in FIG. 22, with the featured patterns marked in black dashed boxes. The featured patterns refer to the whole waveforms marked in the dashed boxes, which can be used for feature extraction in a machine learning algorithm. These patterns are quite unique among different objects, and hence, can be treated as an identity for recognition. As limited by the number of sensors, the basic working mechanism of object recognition is not fully defined by the detection of the object's shape, and in any case the human hand usually cannot cover the whole object. In other words, the outputs from the glove actually indicate the grabbing habits for a specific object by a specific user. For example, the participant may use five fingers to grab the cube but three fingers to grab the small cube, which results in additional outputs from the triboelectric finger bending sensors of the ring and pinky fingers for the larger cube.

As another commonly used machine learning method, support vector machine (SVM) has been widely used as a classifier in various applications of pattern recognition. According to optimization trials using linear kernel and radial basis kernel for classification, and the issue of computing power, the data dimensions were set to 300 for achieving enough accuracy of recognition (see FIG. 34). The data dimensions refer to effective data points of each sample, which in this example is set to be 300. For each sample, there are 16 input channels, and 200 datapoints for each channel. Therefore, the original data dimension is 3200. To reduce the data dimension, principal components analysis (PCA) method was used to extract the features and reduce the dimensions of data down to 300.

Figure 23:
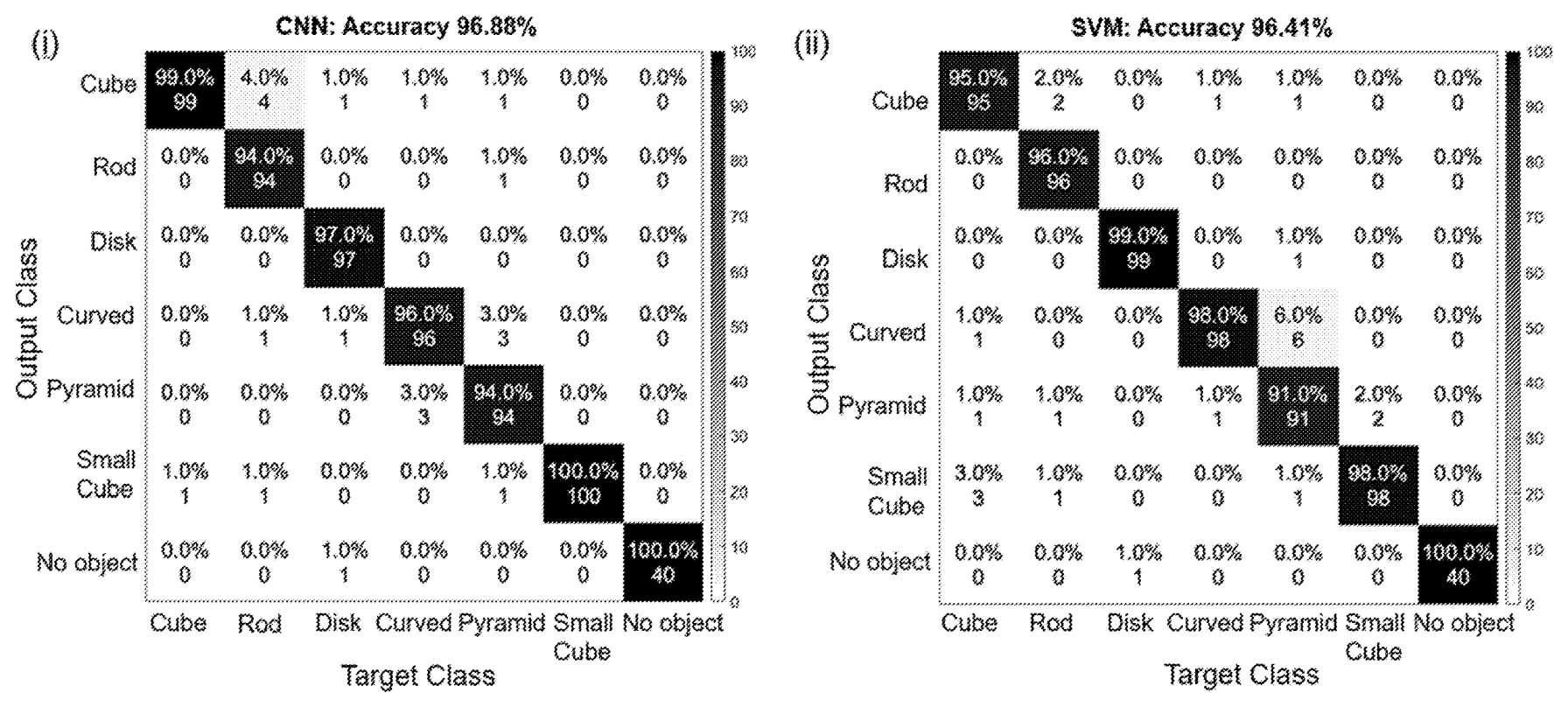

FIG. 23 illustrates confusion maps of object recognition derived from two models made by (i) CNN and (ii) SVM, with 100 tests for each object and 40 tests for baseline, output class refers to the recognized results, and target class refers to the true objects. Output class (Output object) is the output result (recognized identity) of the object recognition algorithm (CNN or SVM) based on the sensing data of grabbing the real object, and target class (target object) is the identity of the true/real objects. If the recognized result is the same as the true object, this result can be counted as a true recognition. Otherwise, the result is a false recognition. For an example in FIG. 23(i), for a true object of Cube, there are 99 output results which are correctly showing the recognition of cube, and only 1 false result gives the identity of a small cube. Hence, the accuracy of cube recognition is 99%. In this map, all of the accuracies of the correct recognitions are aligned in the diagonal direction. The average accuracy is just the overall accuracy for this machine learning algorithm. For each object/class (6 objects/classes in total, except baseline/no object), 100 grabs were made, and the sensing data of these 100 grabs was then fed into the CNN or SVM algorithm for recognition. The output results (100 grabs) of each object refers to the recognized results. The target class/object refers to the true identity of the object/class. The confusion may be plotted to see how many recognized results of each object/class were matched with the true object/class.

The confusion map of models in FIG. 23 shows that both of the two methods (CNN and SVM) can assist the glove-based HMI to achieve object recognition with above 96% accuracy using training samples for each object. There are few objects showing slightly lower accuracy, such as 94% accuracy for the rod and pyramid from the CNN model (FIG. 23(i)), with four outputs falling into the cube and three outputs falling into the curved structure, respectively. By observing the triboelectric output patterns in FIG. 22, some similarities can be found among them. For the rod and cube, the main difference is the signal from the palm sensor, which appears to lead to false object recognition if the signal is too small during grabbing. Similarly, for the curved and pyramid structures, the signals from the ring and pinky fingers are the main features, and the abnormal amplitude of signals from the grabbing of the pyramid may also lead to false object recognition. In the SVM model (FIG. 23(ii)), a 91% accuracy is obtained for pyramid recognition, as six samples are identified as curved for the same reason. Hence, to ensure the stability of performance for irregular human motions, apart from increasing the sample population and tuning the grabbing force, it is also helpful to change the positions of the signals in the time domain to cover the whole segment of collection window.

Figure 32:
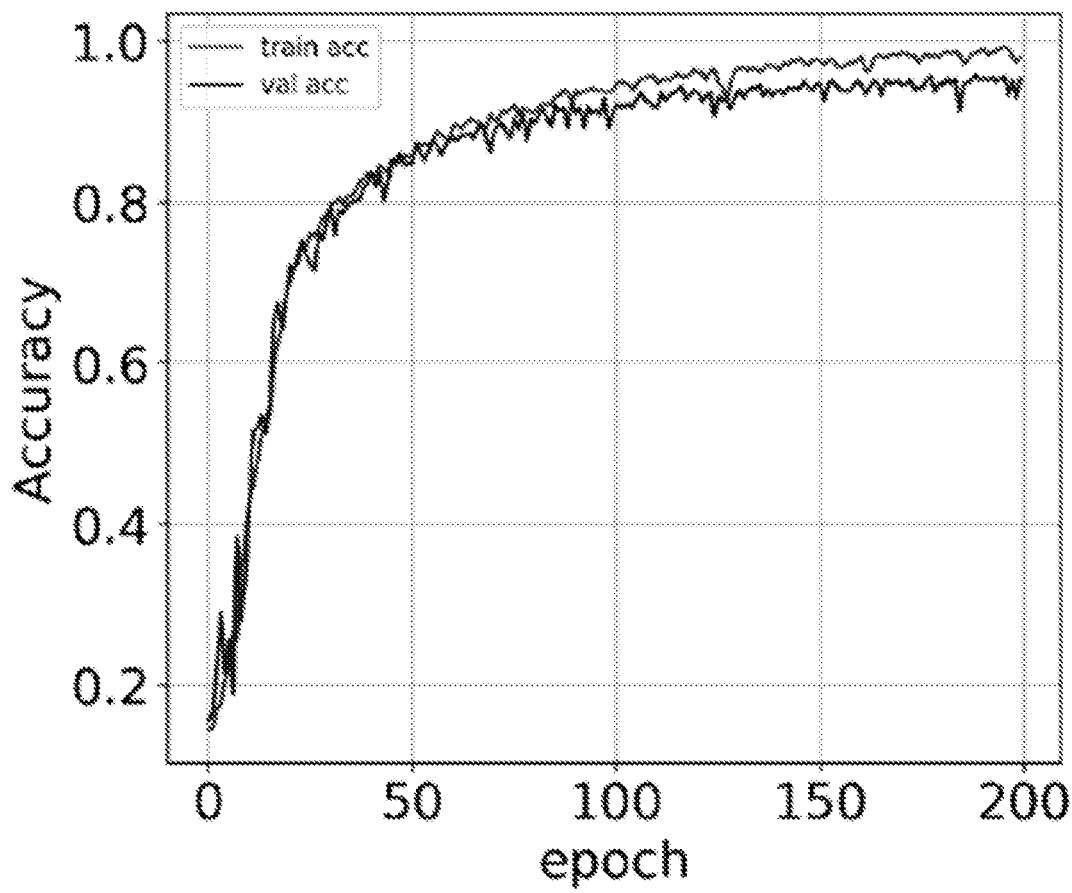
FIG. 32 illustrates accuracy variation with respect to the training epoch, the upper train acc curve is the training accuracy and the lower val acc curve is the validating accuracy.

FIG. 32 refers to a CNN model and illustrates the training accuracy variation with respect to the training epoch (where the number of epochs controls the number of complete passes through the training dataset), the upper curve representing training accuracy and the lower curve representing validation accuracy. As illustrated, in general accuracy improves with increasing epochs.

The comparable results indicate that, for a small amount of sample data with enough distinguishable features, SVM can offer good accuracy of recognition. The CNN model usually provides better performance for a large amount of data with similar patterns, as CNN can automatically extract features rather than using manual selection. Generally, both of the trained recognition models developed from CNN and SVM methods performed well in experiments with the glove described herein. Through the manual extraction of features using principal component analysis (PCA), the classification of the SVM-based model is sufficient. For the CNN method, with more advanced functions of automatic extraction, the described glove only requires a relatively simple network to realize high performance.

Example: Integrated Demonstration in Baseball Game Program

Figure 24A:
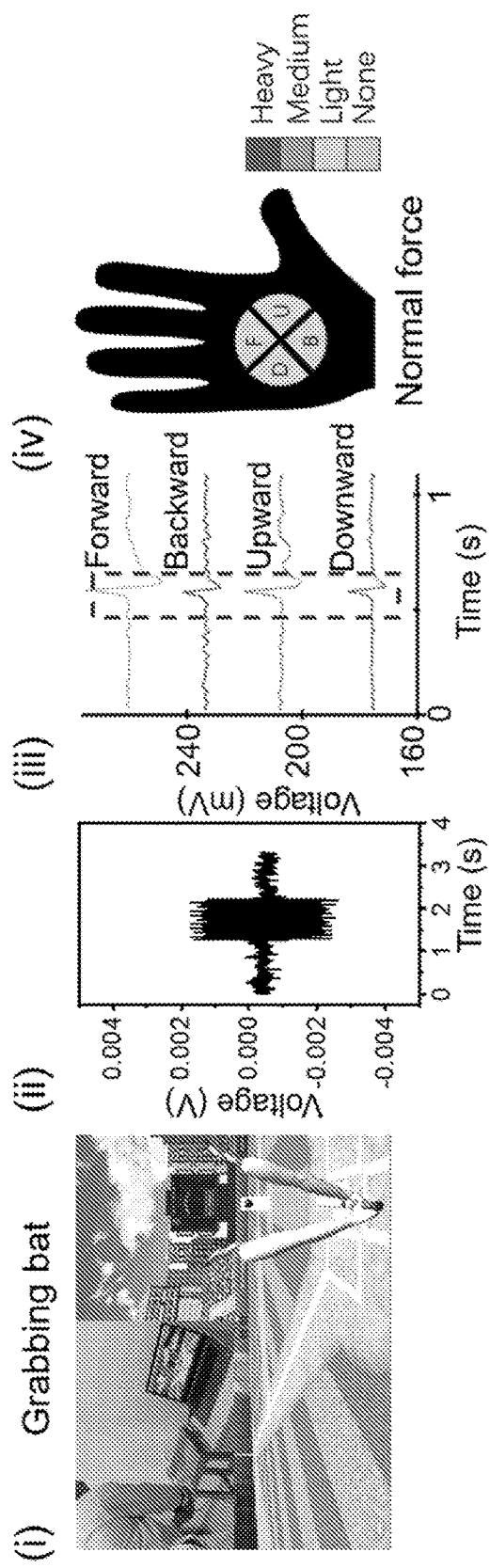
FIG. 24 illustrates an integrated demonstration of an exemplary glove-based HMI in a baseball gaming program, including software screenshots of grabbing a bat (FIG. 24a(i)), a light strike (FIG. 24b(i)), and a heavy strike (FIG. 24c(i)), with a measured output voltage via a second piezoelectric chip from haptic stimulation induced by the piezoelectric stimulator of the glove (FIG. 24a(ii),b(ii),c(ii)), measured triboelectric outputs from four electrodes of a palm sensor of the glove (FIG. 24a(iii),b(iii),c(iii)), and schematics of a corresponding intensity of interactive force exerted on each palm sensor electrode (FIG. 24a(iv),b(iv), c(iv), the arrow mark in FIGS. 24b(iv),c(iv) indicating a direction of shear force defined by a distribution of non-uniform force.
Figure 24B:
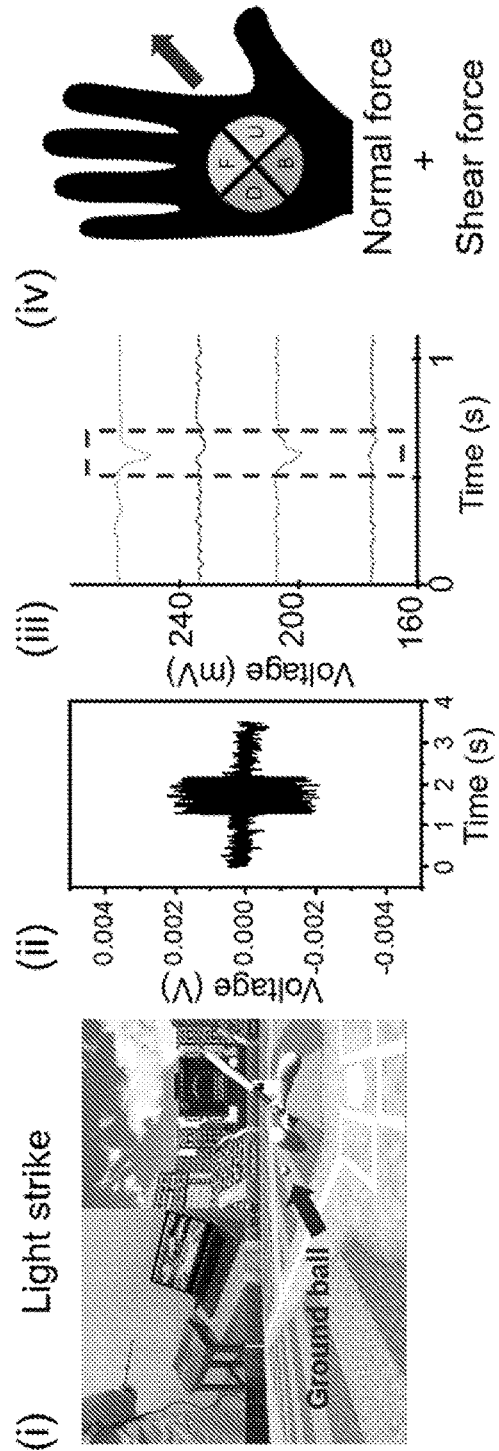
Figure 24C:
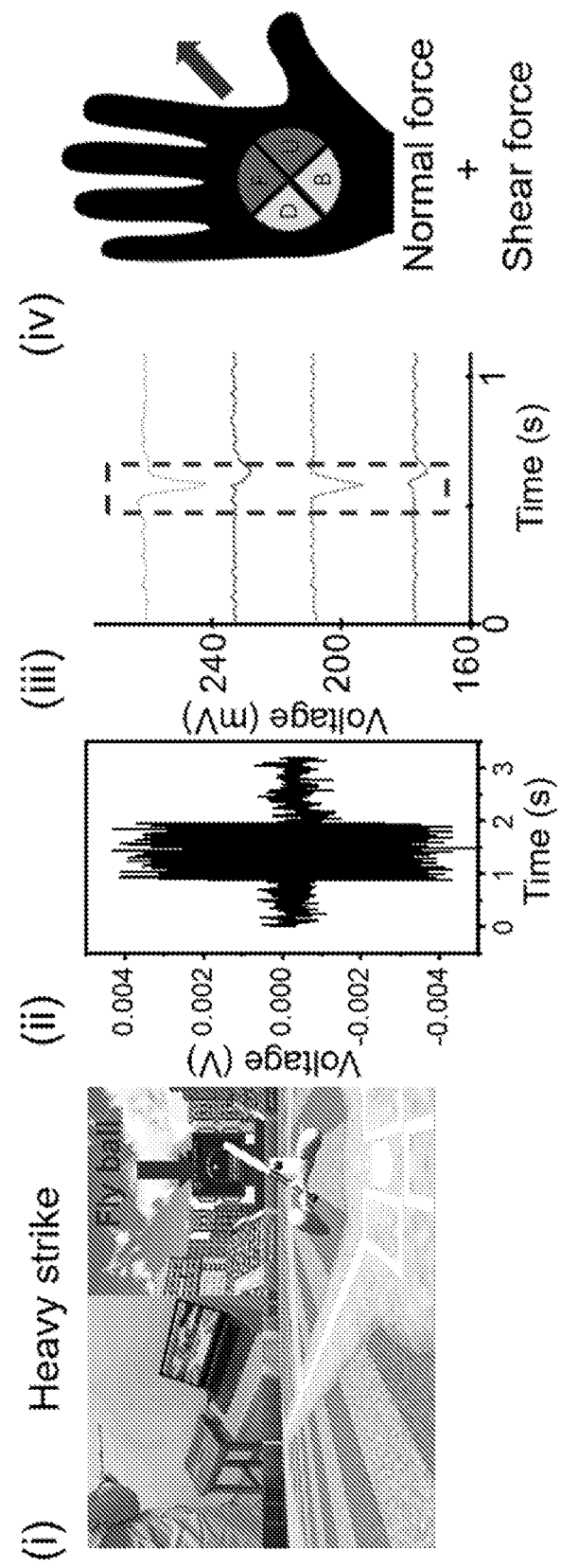
Figure 25:
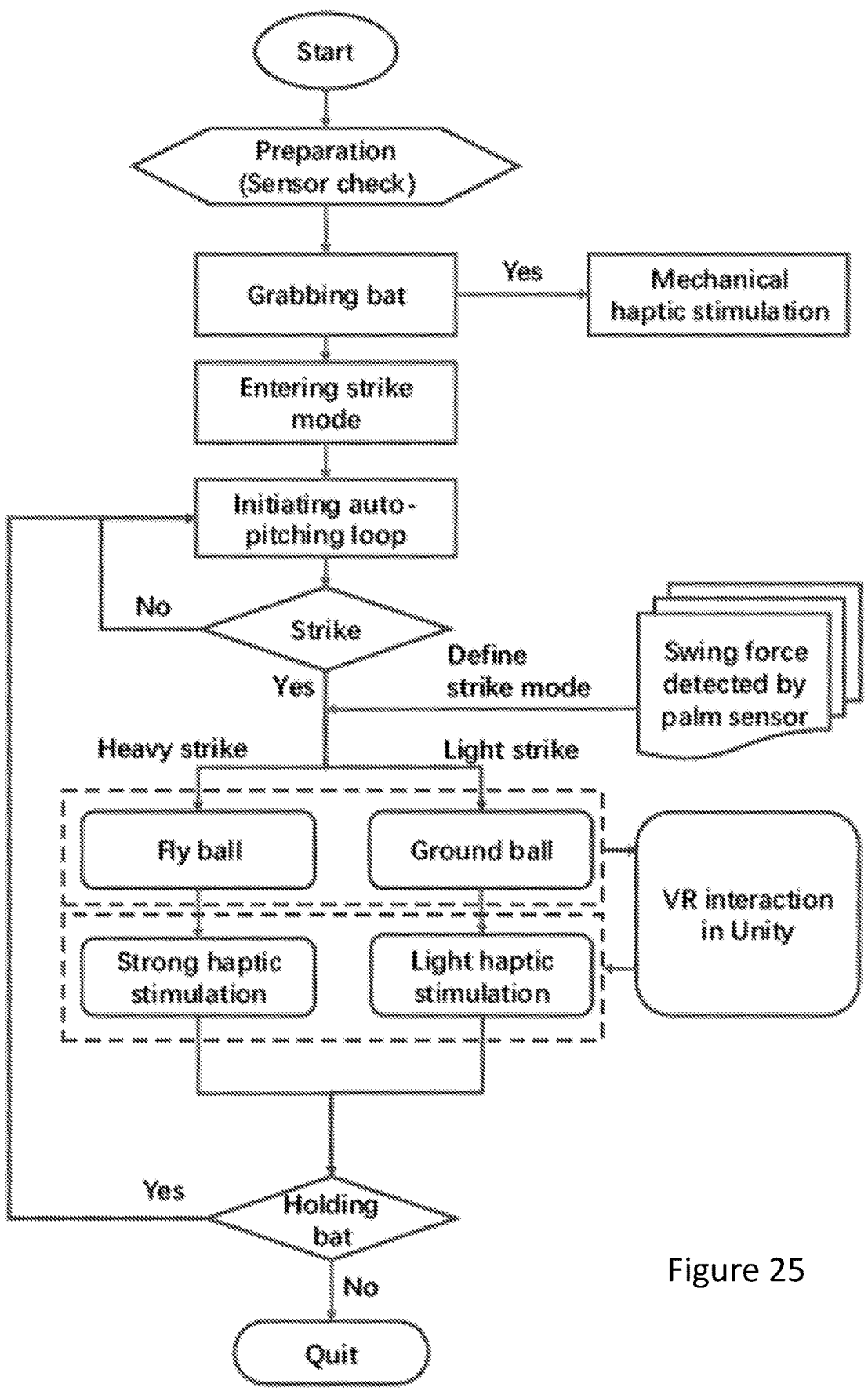
FIG. 25 illustrates a flow chart for an exemplary operation of the baseball program of FIG. 24.

FIG. 24 illustrates an integrated demonstration of the glove-based HMI using a baseball gaming program. Screenshots are provided from the Unity software. An integrated demonstration was prepared using a baseball game program to perform manipulation of a baseball bat with the glove in addition to providing haptic stimulation from the strike event (FIGS. 24a, 24b and 24c illustrate grabbing the bat, light strike and heavy strike respectively). A flow chart for the operation of the baseball program is shown in FIG. 25. As shown in FIG. 25, the logic loop of conducting the baseball game program includes several main steps. Firstly, the program enters a preparation mode for an operational check of the triboelectric finger bending and palm sensors. Next, a grabbing action is detected by both the finger bending sensors and the palm sensor, once the real bat was grabbed. This detection switches the program into a play mode, in which an auto-pitching machine starts a pitching loop. The triboelectric outputs from the palm sensor were detected as having the same amplitude for all four electrodes, which indicates a substantially normal force applied to the palm sensor during the grabbing action. Noticeably, except for the negative peaks used as sensing signals, there were also positive peaks which were mainly caused by the first contact between the bat and the glove, and which would not be obvious after grabbing the bat. Then, at the auto-pitching stage, the user can swing the bat with different speeds to produce a strike, and the reactive force exerted on the palm sensor induces a different triboelectric output accordingly.

FIGS. 24b(iv) and 24c(iv) illustrate that the swinging actions of the bat lead to a non-uniform distribution of contact-related triboelectric output on the four electrodes of the palm sensor, due to the existence of shear force. As an example of a heavy strike (see FIG. 24c(iv)), both forward and upward electrodes of the palm sensor show the largest triboelectric output compared to the downward and backward electrodes. From the schematic of pressure mapping shown in FIG. 24c(iv), by inspecting the trend of output variations the directions of the shear force caused by relative motions between bat and hand are defined, as the upper dome of the palm sensor is pushed forward+upwards, leading to the membrane (upper dome) deflecting more towards the contact of the forward and upward electrodes. The resulting shear force direction is presented as an arrow in FIG. 24c(iv).

As a result of the output from the triboelectric sensors, the corresponding striking actions were performed virtually in the baseball training program, i.e., ground ball or fly ball. The collision event between ball and bat was fed back into a microprocessor in communication with the glove to activate feedback in the form of mechanical stimulation via the glove's PZT chips, with the aid of the Unity collision reactor module, as previously discussed. To differentiate the various strikes for the user, the input voltage for actuating the PZT stimulators is tuned depending on the measured triboelectric output of the palm sensor during swinging.

Figure 26:
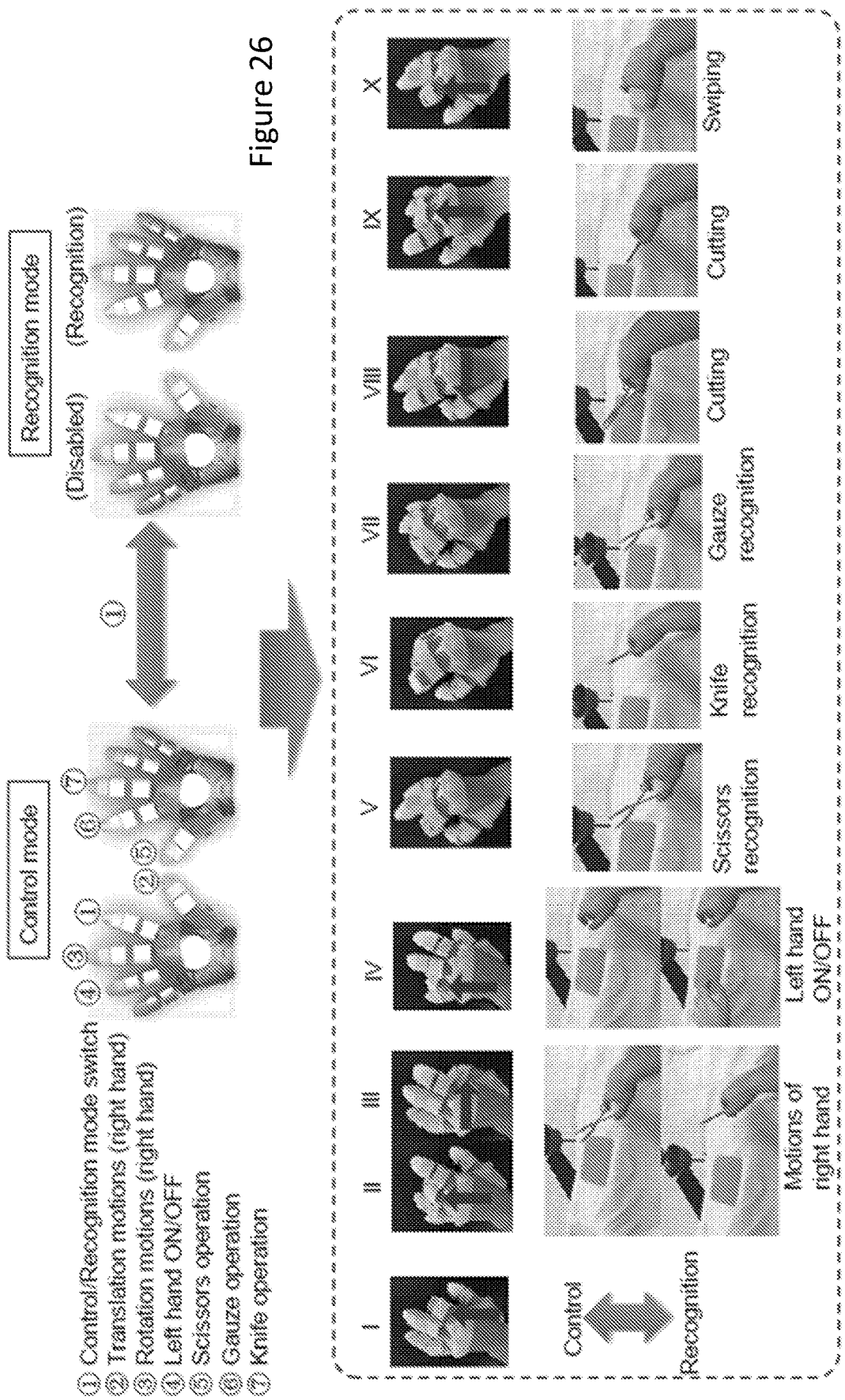
FIG. 26 illustrates an integrated demonstration of an exemplary glove-based HMI in a VR surgical training program, including illustration of functions for the gloves under control mode and recognition mode; illustration of finger motions for realizing (I) mode switching, (II)(III) motions of right hand, (IV) display of left hand, (V) recognition of scissors, (VI) recognition of knife, (VII) recognition of gauze, (VIII) operation of scissors (cutting), (IX) operation of knife (cutting), and (X) operation of gauze (swiping)
Figure 27:
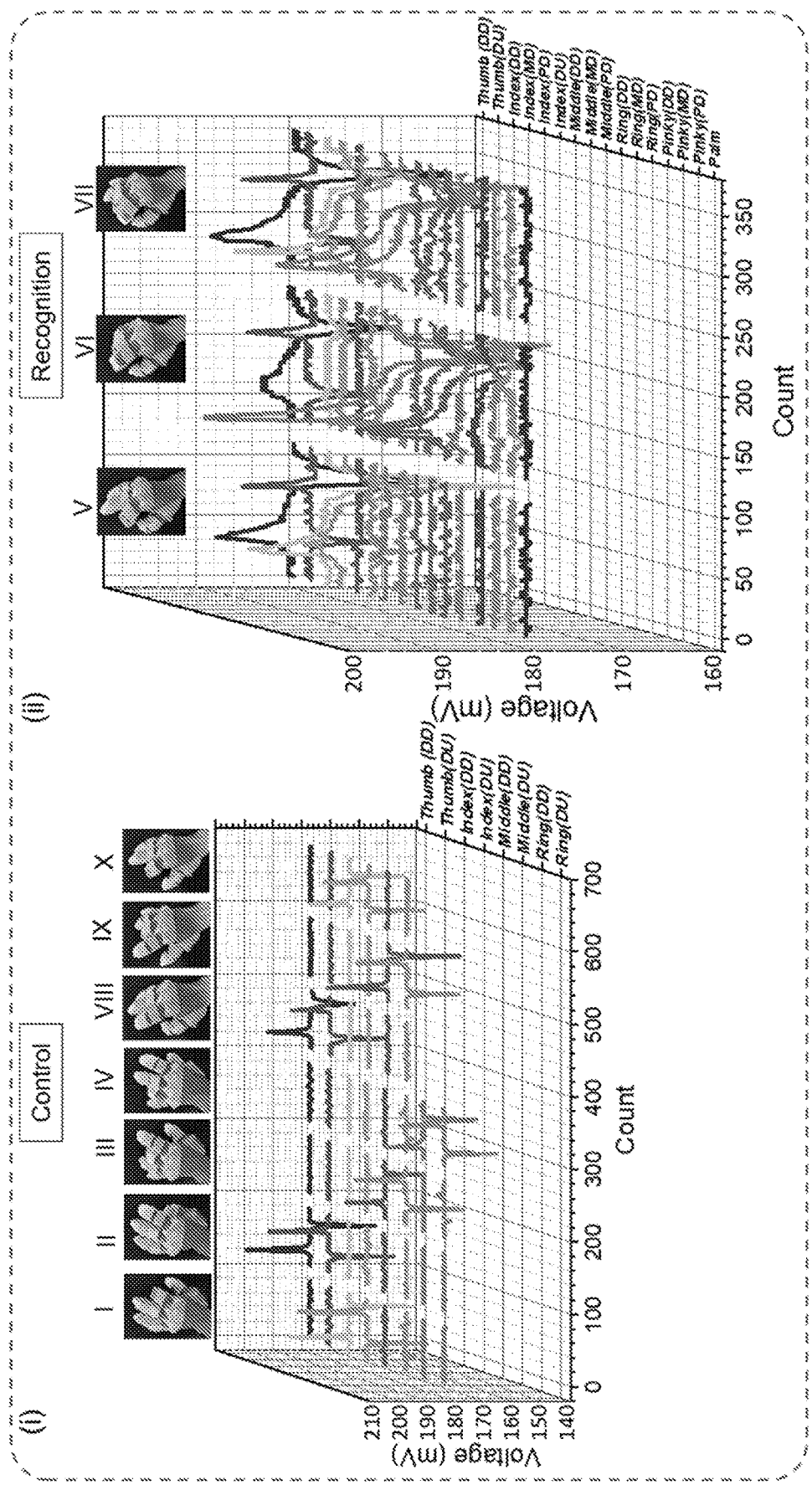
FIG. 27 illustrates triboelectric outputs from eight exemplary sensors used in the demonstration of FIG. 26: thumb (DD and DU), index finger (DD and DU), middle finger (DD and DU), and ring finger (DD and DU) under (i) control mode, and triboelectric outputs from 16 exemplary sensors: thumb (DD and DU), index finger (DD, MD, PD and DU), middle finger (DD, MD, and PD), ring finger (DD, MD, and PD), pinky finger (DD, MD, and PD) and palm (single electrode), under (ii) recognition mode for motions of grabbing scissors, knife, and gauze.
Figure 28:
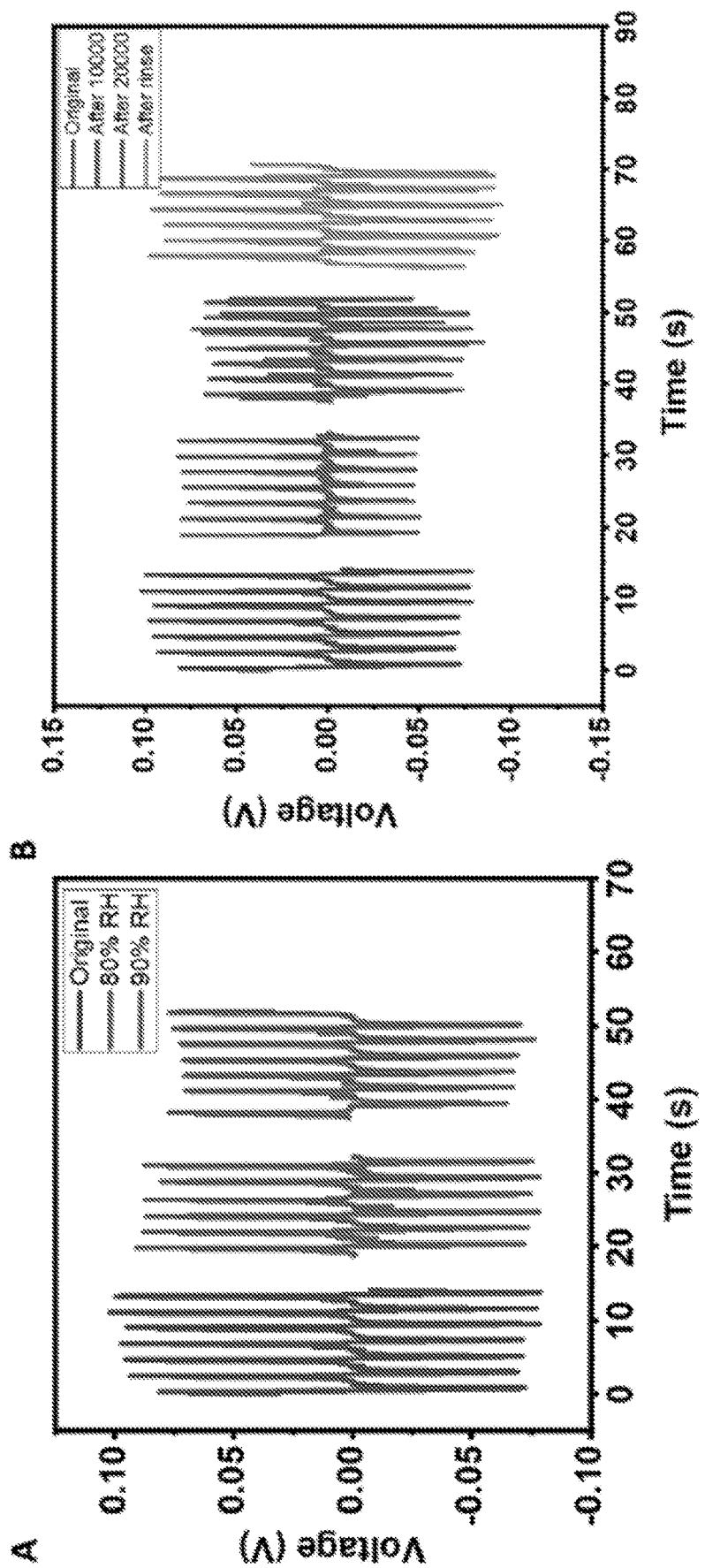
FIG. 28 illustrates (A) output variations from exemplary triboelectric sensors under changing humidity, and (B) output variations of exemplary triboelectric sensors under long-term use and after rinsing.
Figure 29:
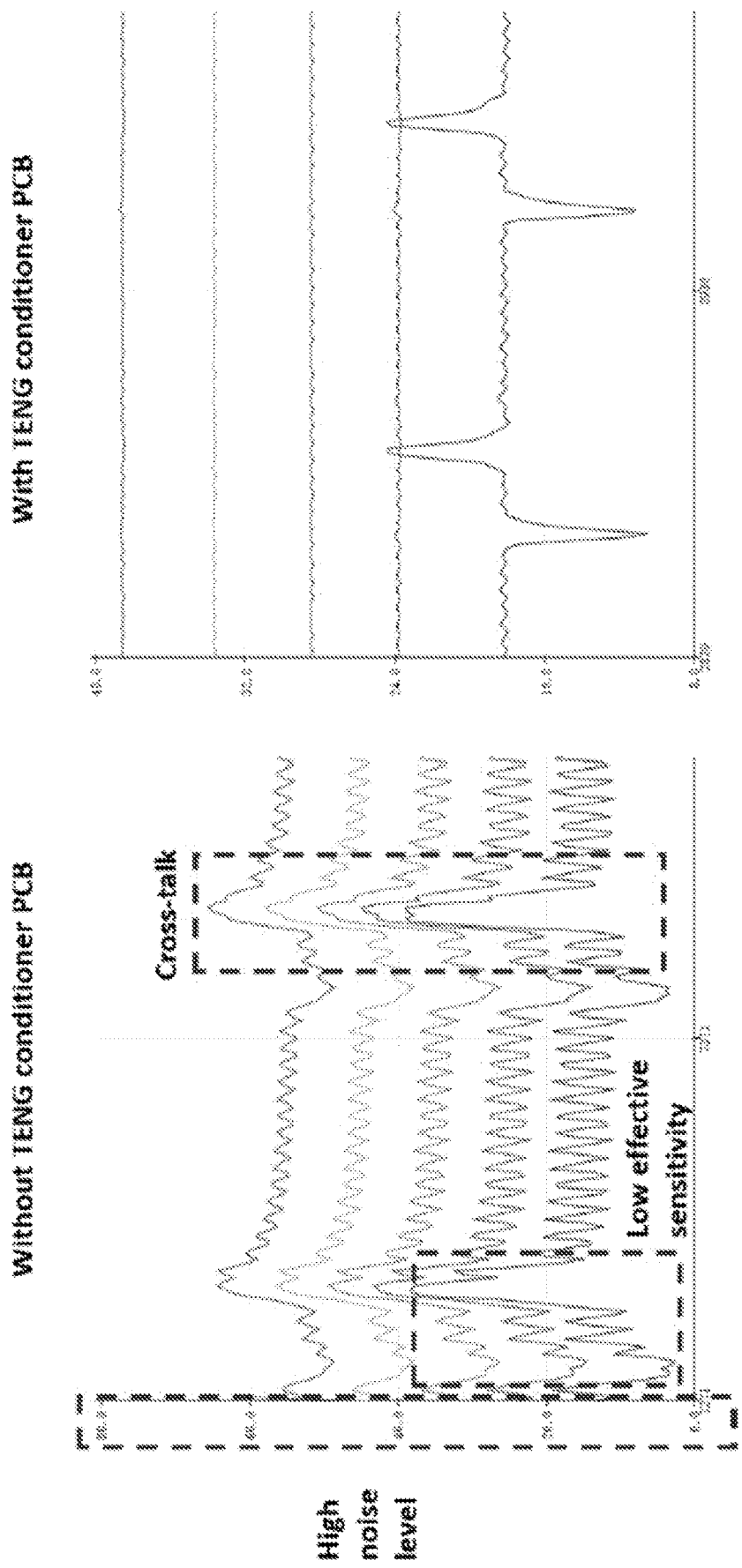
FIG. 29 illustrates individual signal input of exemplary triboelectric sensors under multichannel reading (A) without triboelectric conditioner PCB attached on Arduino microprocessor, (B) with triboelectric conditioner PCB.

Example: Integrated Demonstration in VR Surgical Training Using Object Recognition FIGS. 26 and 27 illustrate an integrated demonstration a pair of glove-based HMIs using a VR surgical training program. As depicted in FIG. 26, in this case the left glove was mainly assigned for controlling motions and operation modes, whereas the right glove was in charge of object recognition and operation. Once the gloves were switched into recognition mode using the left index finger, the left glove was disabled and the right glove started recognizing the grabbing gestures. In terms of recognition of three selected tools (scissors, gauze and surgical knife), the specific triboelectric signals from the grabbing actions are shown in FIG. 27(ii). For example, thumb and index finger were applied by the user for operating scissors, which led to signals from the triboelectric sensors of thumb and index finger only. However, for grabbing the gauze, additional signals from the middle finger were detected as three fingers were used.

After the specific tool was successfully recognized and displayed, the gloves were then switched back to control mode, in which the left thumb and middle finger can control motions of the right virtual hand to locate the operation zone, and the right glove can perform a surgical operation accordingly. The corresponding triboelectric outputs are shown in FIG. 27, together with images of the functioning fingers of the glove.

FIG. 26 illustrates the finger motions for realizing (I) mode switching, (II)(III) motions of the right hand, (IV) display of the left hand, (V) recognition of scissors, (VI) recognition of knife, (VII) recognition of gauze, (VIII) operation of scissors (cutting), (IX) operation of knife (cutting), and (X) operation of gauze (swiping). FIG. 27 illustrates measured triboelectric outputs from eight triboelectric sensors: thumb (DD and DU), index finger (DD and DU), middle finger (DD and DU), and ring finger (DD and DU) under (i) control mode, and triboelectric outputs from 16 sensors: thumb (DD and DU), index finger (DD, MD, PD and DU), middle finger (DD, MD, and PD), ring finger (DD, MD, and PD), pinky finger (DD, MD, and PD) and palm (single electrode), under (ii) recognition mode for the motions of grabbing scissors, knife, and gauze.

As illustrated, during the surgical knife operation, firstly the left ring finger was bent and then straightened to display and hide the left hand by triggering positive triboelectric signals from the ring finger sensor (DD and DU) (FIG. 26(IV) and FIG. 27)(IV)). The left index finger was then bent to trigger the recognition mode via the index finger sensor (DD) (FIG. 26(I) and FIG. 27(i)(I)). During the recognition data collection from the right glove, the right hand mimicked grabbing the surgical knife, and the surgical knife was successfully recognized and presented in VR space (FIG. 26(VI) and FIG. 27(ii)(VI)). Next, the left index finger was returned back to trigger the control mode via the index finger sensor (DU) (FIG. 26(I) and FIG. 27(i)(I)). Next, the left thumb and middle finger were used to move and rotate the right hand to the operation zone (FIG. 26(II)(III) and FIG. 27(i)(II) (III)). Finally, the right middle finger triggered the cutting operation of the surgical knife (FIG. 26(IX) and FIG. 27(i)(IX)).

In general, by leveraging AR techniques, more intuitive interactions regarding communication with virtual characters or objects can be accomplished using the glove described herein, such as (for example) waving, handshaking and raising a glass ("cheers"). The described glove-based HMI can be used as, for example, a terminal for virtual social networks and may be particularly useful in providing the elderly with more interactive communication during remote home care from doctor or family.

Output Variations Under Changing Humidity and Long-Term Use

In general, triboelectric sensors may in some cases experience issues from external influences, such as humidity and contamination. As shown in FIG. 28A, the relative humidity (RH) may be controlled using a humidifier to mimic an increase in water content on the triboelectric sensor surface, derived mainly from environmental moisture and sweat. Where the glove is formed from elastomeric material and has an open structure i.e. separate finger/thumb/palm cases, rapid evaporation of water content occurs and minimizes the output degradation, which was measured at around 15% even at very high humidity levels (e.g. 80%, 90% RH), which are unlikely to occur in normal situations.

Oil and dirt on a user's skin may also have a negative effect on a triboelectric sensor output after long-term use. As shown in FIG. 28B, an investigation of output variations against overall contamination over a certain usage (i.e. 10,000 and 20,000 uses) was conducted. The glove itself (except for the detachable signal processing circuit i.e. the wires which connect the various sensors/chips to a microprocessor) is fully washable, and so the triboelectric output was retested after rinsing, washing and drying the glove. The triboelectric sensors are fully washable, in general the PZT chips may need further encapsulation for enabling the same level of washability. The data indicates that, although the triboelectric output decays with long-term use, it can be returned to the original state (first and fourth waveforms as shown in FIG. 28B) after a simple washing. Therefore, deterioration of triboelectric output can be avoided by washing the glove routinely.

Customized Triboelectric Conditioner PCB for Optimizing Multichannel Sensing

An Analog to Digital Converter (ADC) is generally used for various sensing applications. In most cases, multichannel sensing is performed using a single ADC and applying sequential scanning of a series of input channels, rather than using an ADC for each channel, in order to reduce costs. However, in terms of simultaneous multichannel sensing, especially for triboelectric sensors, there are several constraints which need to be overcome for realizing real-time control of an entire hand, as described below and as generally illustrated in FIG. 29A:

(1) Mismatch of small triboelectric output (~100 mV) against the much larger measurement range of the ADC (e.g. Arduino) (0~5V), which leads to a high noise level and low effective sensitivity.

(2) Cross-talk issues, especially caused by those channels near the input channel, currently being scanned, which is possibly due to the coupling effect of adjacent channels via the sampling capacitance of ADC.

To solve the above-mentioned issues, an exemplary method is illustrated in FIG. 29B. This method uses a customized triboelectric conditioner PCB (TENG—triboelectric nanogenerator conditioner), on which the signal readout is optimized via an operational amplifier to enhance sensitivity, and all the input channels are grounded to avoid cross-talk while maintaining a floating signal to acquire the entire triboelectric waveform. In one example, for the development boards of an Arduino MEGA 2560 model, a total of 8 integrated amplifier circuits were designed for 16 analog input channels.

Figure 30:
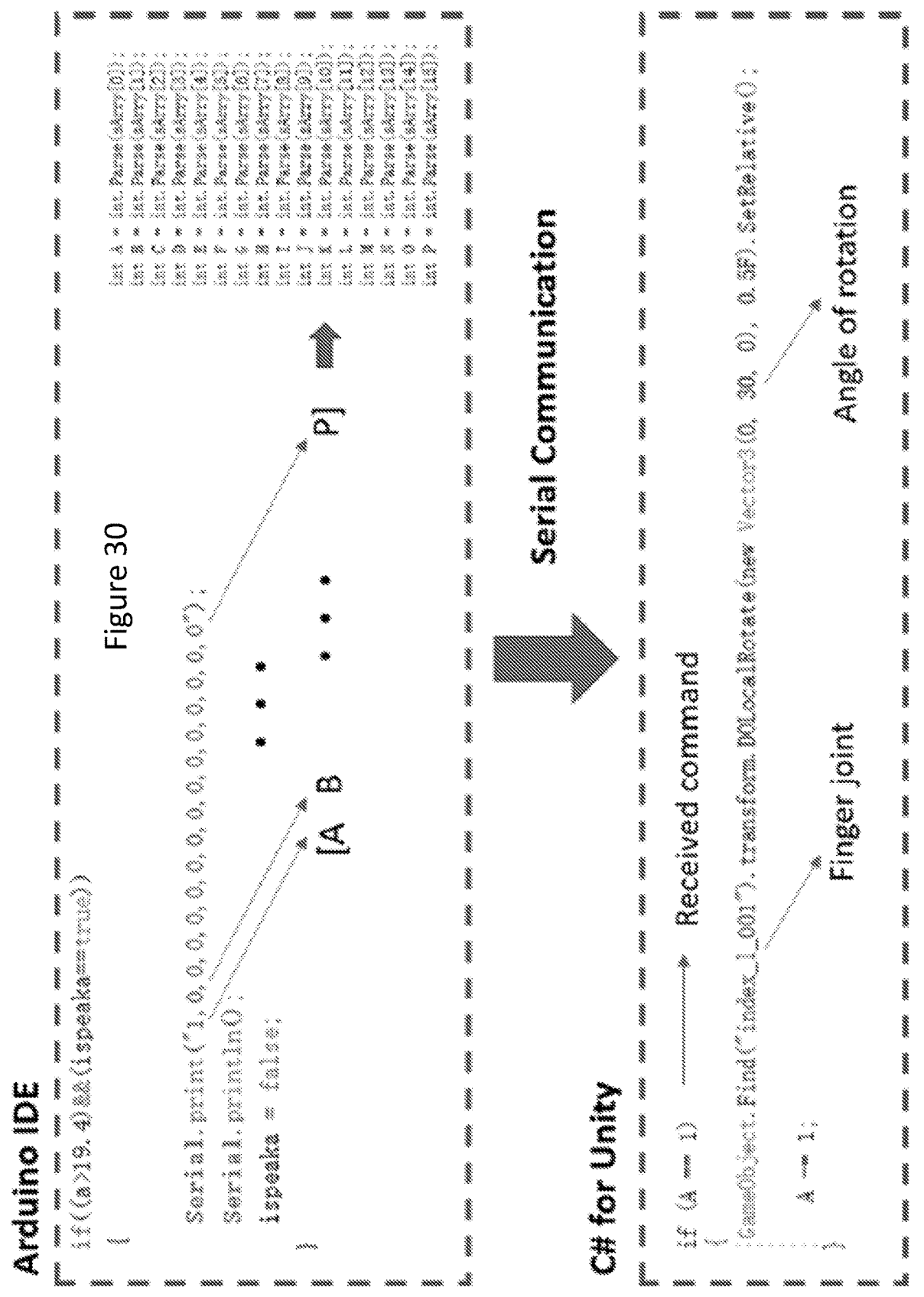

Core Functions in the Realization of Virtual Hand Control and Virtual Event Feedback In one example, for the virtual hand controlling part depicted in FIG. 30, all signals from the triboelectric sensors are pre-processed by a conditioner PCB, as discussed above, and then received by a microprocessor PCB, such as an Arduino MEGA 2560 PCB. In one example, the PCB can be designed as a detachable module to the glove, along with the wireless module, so that the signal can be transmitted wirelessly to a computer. Each Arduino PCB contains 16 analog input channels. After threshold calibration of each triboelectric sensor, the identification code is in charge of recognizing the triggering signal and sending out the string of numbers, such as "1,0,0,0,0,0,0,0,0,0,0,0,0,0,0,0" (16 numbers stand for 16 channels) indicating that finger bending is detected by the first sensor with bending level 1. On the processing software (e.g. Unity) side, the protocol of serial communication allows this string of numbers to be received, and allocated to a specific name. Hence, by defining the corresponding finger joint and using the controlling code, the bending motion of a virtual hand can be realized as the projection of the real hand in virtual space.

Figure 31:
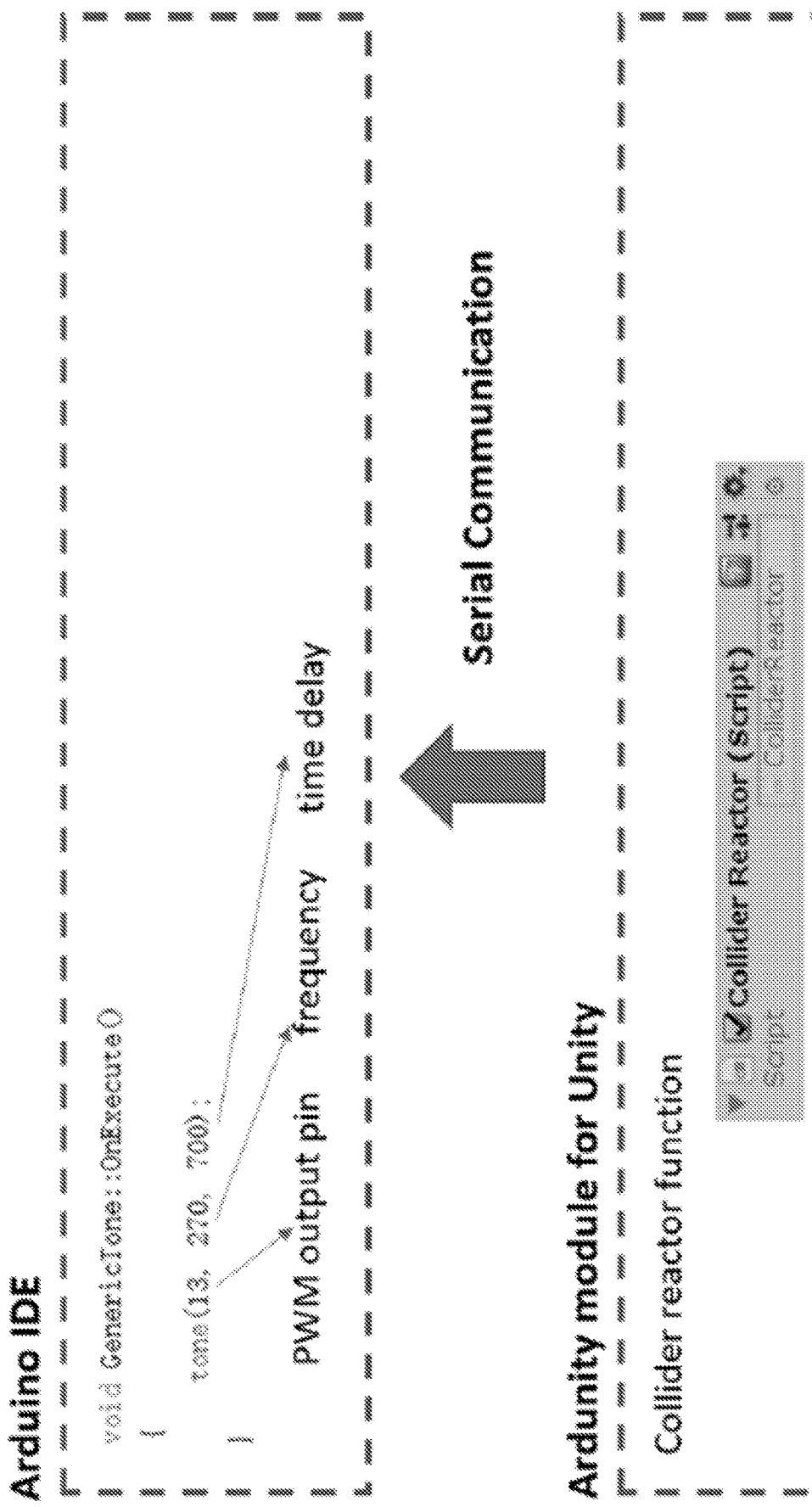

In one example, for the haptic feedback part shown in FIG. 31, a reverse process of event projection can be carried out by applying an open source module in the processing software (e.g. Unity), called Ardunity, which is specially designed for initiating mutual communication between Arduino and Unity. The collide reactor function in Ardunity offers the possibility of transferring virtual events into the microprocessor for enabling various responses, such as light, vibration, and voice etc. Hence, once the collide reactor recognizes an interaction event, by defining the PWM operation frequency and matching this with PZT resonant frequency in Arduino IDE, vibrational haptic feedback to the user can be triggered via serial communication.

The multi-functional glove based HMI described herein has several advantages compared to conventional HMIs. For example, the HMI is cheaper to manufacture, has lower energy consumption, is more user friendly and has high customizability and signal stability for a variety of human hand sizes.

Overall, a smart glove with facile designed triboelectric sensors and piezoelectric haptic mechanical stimulators indicates the potentials of constructing a low-cost and low power consumption HMI which is capable of achieving multi-dimensional and multi-purpose manipulations in VR/AR. The high customizability of the glove ensures user-friendliness and signal stability for a variety of human hands. In the future of 5G communication and IoT, applications under human-machine interaction will significantly affect the lifestyle of humans. In a social network aspect, this kind of device can improve the intelligence of machines based on acquired big data from AI techniques. In terms of VR training programs, augmented dual-way interaction can be achieved by the above described glove for improving training effectiveness. In general, the glove reveals a new possibility for being an HMI solution that is comparable with the current inertial and resistive based gloves for the applications on VR training, entertainment, social network, and robotic control, etc.

The invention claimed is:

1. A wearable human machine interface (HMI) configured to be worn on a human wearer's hand, the interface comprising:
   a plurality of triboelectric finger sensors configured to detect finger bending, deflecting, and/or curling, each triboelectric finger sensor comprising a contact portion and an electrode portion;
   a triboelectric palm sensor configured to detect an applied force from the wearer's hand and its direction; and
   at least one mechanical stimulator configured to provide haptic feedback;
   wherein each triboelectric finger sensor is associated with a respective phalanx of a finger or thumb of the wearer's hand and configured to detect motion and direction of said motion of the respective phalanx independently of the other phalanxes;
   wherein the contact portion of each triboelectric finger sensor is arranged to be directly contactable by a skin of the respective phalanx;
   wherein the plurality of triboelectric finger sensors are configured to generate triboelectric outputs in response to changes in direct contact between the contact portions and the skin of the phalanxes, said motion and direction of motion detectable based on changes in the triboelectric outputs.

2. The interface as claimed in claim 1, further comprising a wearable case for supporting said sensors and stimulator, wherein said sensors are attached to inner surfaces of the wearable case.

3. The interface as claimed in claim 2, wherein the wearable case comprises a plurality of case segments, including a palm segment and multiple finger segments.

4. The interface as claimed in claim 3, comprising a wiring assembly configured to bias the interface towards an initial position.

5. The interface as claimed in claim 4, said wiring assembly configured to interconnect the plurality of case segments.

6. The interface as claimed in claim 1, wherein the plurality of triboelectric finger sensors comprises at least one triboelectric finger sensor associated with each proximal phalanx of a finger or thumb and configured to said motion and direction of motion of the associated proximal phalanx in up, down, left, and right directions.

7. The interface as claimed in claim 1, wherein the contact portion of each sensor comprises a raised contact surface and a flat bottom, wherein the electrode portion is embedded in or otherwise attached to the flat bottom, and wherein the raised contact surface is preferably hemispherical.

8. The interface as claimed in claim 1, wherein the contact portion of each sensor comprises elastomeric material that is directly contactable by the skin of the wearer's finger or thumb to thereby generate the triboelectric output.

9. The interface as claimed in claim 1, wherein the plurality of triboelectric finger sensors comprises sixteen triboelectric finger sensors.

10. The interface as claimed in claim 1, wherein said triboelectric palm sensor comprises an upper contact portion, a lower contact portion within said upper contact portion, and an electrode portion configured to be directly contactable by the lower contact portion, said contact generating a triboelectric output.

11. The interface as claimed in claim 10, wherein the upper contact portion comprises a dome, the lower contact portion comprises four hemispheres located within said dome, and the electrode portion comprises four contact pads, each hemisphere configured to act as a respective contact point for a corresponding contact pad of the electrode portion upon application of an external force to the dome.

12. The interface as claimed in claim 10, wherein the upper contact portion and the lower contact portion of the palm sensor comprise elastomeric material.

13. The interface as claimed in claim 1, wherein the at least one mechanical stimulator comprises a piezoelectric (PZT) chip.

14. The interface as claimed in claim 13, wherein the interface comprises five PZT chips, each respectively associable, in use, with a finger or thumb of the wearer.

15. A human machine interface system, comprising:
the wearable human machine interface (HMI) of claim 1;
a microprocessor configured to receive triboelectric outputs from the plurality of triboelectric finger sensors and/or the triboelectric palm sensor and to determine, based on said triboelectric outputs, a degree of said motion of the phalanxes;
said microprocessor further configured to output a signal to actuate vibration of the at least one mechanical stimulator.

16. The system of claim 15, wherein said microprocessor is configured to output the signal to the at least one mechanical stimulator based upon a triboelectric output received from the palm sensor.

17. The system of claim 16, wherein said microprocessor is configured to modify an amplitude of the signal to the at least one mechanical stimulator based upon a triboelectric output received from the palm sensor.

18. The system of claim 16, wherein said microprocessor is configured to determine, based upon a triboelectric output received from the palm sensor, a direction of the applied force.

19. The system of claim 16, wherein said microprocessor is configured to output, to a neural network, triboelectric outputs from the plurality of triboelectric finger sensors and/or the triboelectric palm sensor.

20. A method of object recognition comprising:
receiving, by a neural network, triboelectric outputs of the plurality of triboelectric finger sensors and/or the triboelectric palm sensor of the HMI interface of claim 1, said triboelectric outputs generated during grabbing of an object by the wearer of the HMI interface.

* * * * *